United States Patent
Kawai et al.

(10) Patent No.: US 12,126,920 B2
(45) Date of Patent: Oct. 22, 2024

(54) IMAGING APPARATUS, DRIVING METHOD OF IMAGING APPARATUS, AND PROGRAM

(71) Applicant: FUJIFILM Corporation, Tokyo (JP)

(72) Inventors: Tomoyuki Kawai, Saitama (JP); Koichi Tanaka, Saitama (JP); Yuya Nishio, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 62 days.

(21) Appl. No.: 18/185,353

(22) Filed: Mar. 16, 2023

(65) Prior Publication Data

US 2023/0269497 A1 Aug. 24, 2023

Related U.S. Application Data

(63) Continuation of application No. PCT/JP2021/034049, filed on Sep. 16, 2021.

(30) Foreign Application Priority Data

Sep. 29, 2020 (JP) ................................. 2020-163984

(51) Int. Cl.
*H04N 25/42* (2023.01)
*H04N 25/533* (2023.01)
*H04N 25/704* (2023.01)

(52) U.S. Cl.
CPC ........... *H04N 25/42* (2023.01); *H04N 25/533* (2023.01); *H04N 25/704* (2023.01)

(58) Field of Classification Search
CPC ...... H04N 23/60; H04N 25/42; H04N 25/445; H04N 25/53; H04N 25/533; H04N 25/704

See application file for complete search history.

(56) References Cited

U.S. PATENT DOCUMENTS

2012/0038810 A1\* 2/2012 Taniguchi ......... H01L 27/14621
348/308
2017/0264849 A1\* 9/2017 Shiohara ................ H04N 23/80
(Continued)

FOREIGN PATENT DOCUMENTS

| JP | 2010219958 | 9/2010 |
| JP | 2018066931 | 4/2018 |
| WO | 2018088119 | 5/2018 |

OTHER PUBLICATIONS

"International Search Report (Form PCT/ISA/210) of PCT/JP2021/034049," mailed on Nov. 30, 2021, with English translation thereof, pp. 1-5.

(Continued)

*Primary Examiner* — Amy R Hsu
(74) *Attorney, Agent, or Firm* — JCIPRNET

(57) ABSTRACT

The imaging element has a first and a second phase difference pixel region each including the plurality of phase difference pixels, and an imaging pixel region between the first and the second phase difference pixel region in the first direction. The processor is configured to cause the imaging element to perform imaging at a frame cycle, execute first readout processing of reading out a signal from the first phase difference pixel region during a first frame period, and execute second readout processing of reading out a signal from the second phase difference pixel region during a second frame period subsequent to the first frame period. A first exposure time, during which the first phase difference pixel region is exposed, and a second exposure time, during which the second phase difference pixel region is exposed, are different from an exposure time of the imaging pixel region.

15 Claims, 19 Drawing Sheets

(56) References Cited

U.S. PATENT DOCUMENTS

| | | |
|---|---|---|
| 2018/0115729 A1 | 4/2018 | Ise et al. |
| 2019/0222784 A1 | 7/2019 | Ise et al. |
| 2019/0268530 A1 | 8/2019 | Kawai |
| 2019/0379844 A1* | 12/2019 | Chen ................. H01L 27/14652 |
| 2020/0046310 A1* | 2/2020 | Richard ................. H04N 23/30 |
| 2020/0213539 A1* | 7/2020 | Suzuki ................. H04N 25/771 |
| 2020/0314376 A1* | 10/2020 | Kim ...................... G01S 17/894 |
| 2020/0322554 A1* | 10/2020 | Tanaka ................... H04N 25/60 |

OTHER PUBLICATIONS

"Written Opinion of the International Searching Authority (Form PCT/ISA/237) of PCT/JP2021/034049," mailed on Nov. 30, 2021, with English translation thereof, pp. 1-9.

* cited by examiner

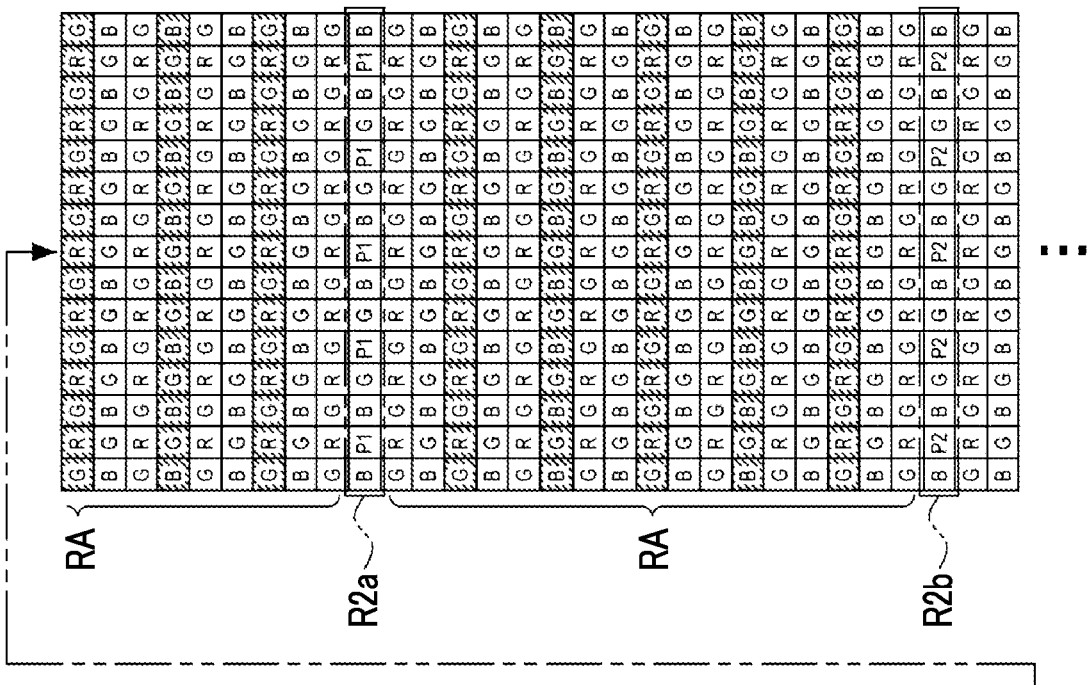
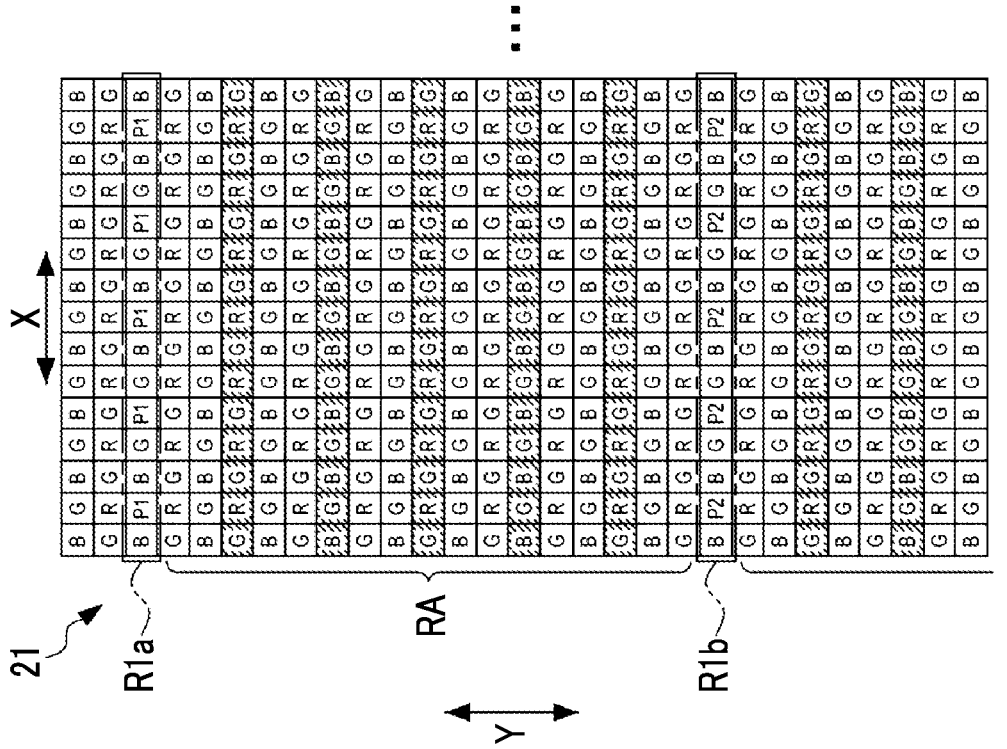
FIG. 20

IMAGING APPARATUS, DRIVING METHOD OF IMAGING APPARATUS, AND PROGRAM

CROSS-REFERENCE TO RELATED APPLICATIONS

This application is a continuation of International Application No. PCT/JP2021/034049, filed on Sep. 16, 2021, which claims priority from Japanese Application No. 2020-163984, filed on Sep. 29, 2020. The entire disclosure of each of the above application is incorporated herein by reference.

BACKGROUND

Technical Field

The technique of the present disclosure relates to an imaging apparatus, a driving method of the imaging apparatus, and a program.

Related Art

The imaging apparatus described in JP 2010-219958 A, includes: an imaging element that has a plurality of pixels two-dimensionally arranged, the imaging element having imaging pixels, which generate signals for image generation by performing photoelectric conversion of a subject image formed through an imaging lens, and focus detection pixels, which are discretely disposed between the plurality of imaging pixels to generate signals for phase difference detection by dividing a pupil region of the imaging lens and performing photoelectric conversion of subject images from the divided pupil regions; a switching unit that performs switching between an all-pixel readout mode for reading out signals of all pixels of the plurality of pixels and a thinning-out readout mode for thinning out and reading out signals of the plurality of pixels; and a control unit that performs charge accumulation control independently in imaging rows used for image generation and focus detection rows including the focus detection pixels in a case where the current mode is switched to the thinning-out readout mode.

SUMMARY

According to one technique of the present disclosure, there are provided an imaging apparatus, a driving method, and a program capable of making an exposure time of a phase difference pixel equal to or longer than a frame cycle and reading out a signal from the phase difference pixel for each frame cycle.

In order to achieve the above-mentioned object, according to an aspect of the present disclosure, there is provided an imaging apparatus comprising: a processor; and an imaging element that includes column signal lines which are for reading out signals and extend signals and extend in a first direction and a plurality of phase difference pixels which are arranged in a second direction intersecting the first direction. The imaging element has a first phase difference pixel region and a second phase difference pixel region each including the plurality of phase difference pixels, and an imaging pixel region between the first phase difference pixel region and the second phase difference pixel region in the first direction. The processor is configured to cause the imaging element to perform imaging at a frame cycle, execute first readout processing of reading out a signal from the first phase difference pixel region during a first frame period, and execute second readout processing of reading out a signal from the second phase difference pixel region during a second frame period subsequent to the first frame period. A first exposure time, during which the first phase difference pixel region is exposed, and a second exposure time, during which the second phase difference pixel region is exposed, are different from an exposure time of the imaging pixel region.

It is preferable that the first exposure time and the second exposure time are each equal to or greater than the frame cycle.

It is preferable that the first exposure time and the second exposure time are different from each other.

It is preferable that the processor is configured to: make a first mode executable, in which the first readout processing and the second readout processing are alternately executed such that the first exposure time and the second exposure time are each less than twice the frame cycle.

It is preferable that the processor is configured to: make a second mode executable, in which the second exposure time is set to be equal to or greater than K times the frame cycle and less than K+1 times the frame cycle, the first readout processing is executed K times during an exposure period of the second phase difference pixel region, and the second readout processing is executed once each time the first readout processing is executed K times, in a case where K is an integer equal to or greater than 2.

It is preferable that in the second mode, the first exposure time is less than the frame cycle.

It is preferable that the processor is configured to: perform switching between the first mode and the second mode in accordance with a brightness of a subject.

It is preferable that the processor is configured to: make a third mode executable, in which only the first readout processing is repeated without performing the second readout processing.

It is preferable that the processor is configured to: perform switching between the first mode and the third mode in accordance with a speed of movement of a subject.

It is preferable that in a case where N is an integer equal to or greater than 3, the imaging element has N phase difference pixel regions ranging from the first phase difference pixel region to Nth phase difference pixel region arranged in the second direction, and the processor selects each of the phase difference pixel regions for each frame cycle and reads out a signal, and makes an exposure time of the phase difference pixel region less than N times the frame cycle.

It is preferable that the imaging element includes a plurality of row selection lines extending in the second direction, the first phase difference pixel region includes a pair of first phase difference pixels as the plurality of phase difference pixels, the second phase difference pixel region includes a pair of second phase difference pixels as the plurality of phase difference pixels, the pair of first phase difference pixels are selected through the same row selection line, the pair of second phase difference pixels are selected through the same row selection line, and the first phase difference pixel region and the second phase difference pixel region are alternately disposed in the first direction with the imaging pixel region interposed therebetween.

It is preferable that the imaging element includes a plurality of row selection lines extending in the second direction, the first phase difference pixel region includes a pair of first phase difference pixels as the plurality of phase difference pixels, the second phase difference pixel region includes a pair of second phase difference pixels as the plurality of phase difference pixels, the pair of first phase difference pixels are respectively selected through the plurality of row selection lines arranged in the first direction, the pair of second phase difference pixels are respectively selected through the plurality of row selection lines arranged in the first direction, and the first phase difference pixel region and the second phase difference pixel region are alternately disposed in the first direction with the imaging pixel region interposed therebetween.

It is preferable that the plurality of phase difference pixels included in the first phase difference pixel region and the second phase difference pixel region and imaging pixels in the imaging pixel region each have a pair of photoelectric conversion elements, the processor reads out a signal of one of the pair of photoelectric conversion elements in the plurality of phase difference pixels, and reads out the signal from both of the pair of photoelectric conversion elements from the imaging pixel, and the first phase difference pixel region and the second phase difference pixel region are alternately disposed in the first direction with the imaging pixel region interposed therebetween.

According to an aspect of the present disclosure, there is provided a driving method of an imaging apparatus that has an imaging element including column signal lines which are for reading out signals and extend signals and extend in a first direction and a plurality of phase difference pixels which are arranged in a second direction intersecting the first direction. The imaging element has a first phase difference pixel region and a second phase difference pixel region each including the plurality of phase difference pixels, and an imaging pixel region between the first phase difference pixel region and the second phase difference pixel region in the first direction. The driving method comprises: causing the imaging element to perform imaging at a frame cycle; executing first readout processing of reading out a signal from the first phase difference pixel region during a first frame period; and executing second readout processing of reading out a signal from the second phase difference pixel region during a second frame period subsequent to the first frame period. A first exposure time, during which the first phase difference pixel region is exposed, and a second exposure time, during which the second phase difference pixel region is exposed, are different from an exposure time of the imaging pixel region.

According to an aspect of the present disclosure, there is provided a program for operating an imaging apparatus that has an imaging element including column signal lines which are for reading out signals and extend signals and extend in a first direction and a plurality of phase difference pixels which are arranged in a second direction intersecting the first direction. The imaging element has a first phase difference pixel region and a second phase difference pixel region each including the plurality of phase difference pixels, and an imaging pixel region between the first phase difference pixel region and the second phase difference pixel region in the first direction. The program causes the imaging apparatus to execute: imaging at a frame cycle by using the imaging element; first readout processing of reading out a signal from the first phase difference pixel region during a first frame period; and second readout processing of reading out a signal from the second phase difference pixel region during a second frame period subsequent to the first frame period. A first exposure time, during which the first phase difference pixel region is exposed, and a second exposure time, during which the second phase difference pixel region is exposed, are different from an exposure time of the imaging pixel region.

BRIEF DESCRIPTION OF THE DRAWINGS

FIG. 20 is a diagram showing pixels from which signals are read out in the motion picture imaging mode in the first modification example.

DESCRIPTION

An example of an embodiment relating to the technique of the present disclosure will be described with reference to the accompanying drawings.

First, the wording used in the following description will be described.

In the following description, the "IC" is an abbreviation for "Integrated Circuit". The "CPU" is an abbreviation for "Central processing Unit". The "ROM" is an abbreviation for "Read Only Memory". The "RAM" is an abbreviation for "Random Access Memory". The "CMOS" is an abbreviation for "Complementary Metal Oxide Semiconductor". The EEPROM is an abbreviation for "Electrically Erasable Project-Only Memory".

The "FPGA" is an abbreviation for "Field-Programmable Gate Array". The "PLD" is an abbreviation for "Programmable Logic Device". The "ASIC" is an abbreviation for "Application Specific Integrated Circuit". The "JPEG" is an abbreviation for "Joint Photographic Experts Group".

As used herein, the term "equal" includes not only being exactly equal, but also being substantially equal in the sense that it includes errors that are generally tolerated in the art of the technique of the present disclosure.

First Embodiment

As a first embodiment of the imaging apparatus, the technique of the present disclosure will be described by using an interchangeable lens digital camera as an example. The technique of the present disclosure is not limited to the interchangeable lens type, and can be applied to a digital camera having a lens integrated therein.

(Configuration of Imaging Apparatus)

Figure 1:
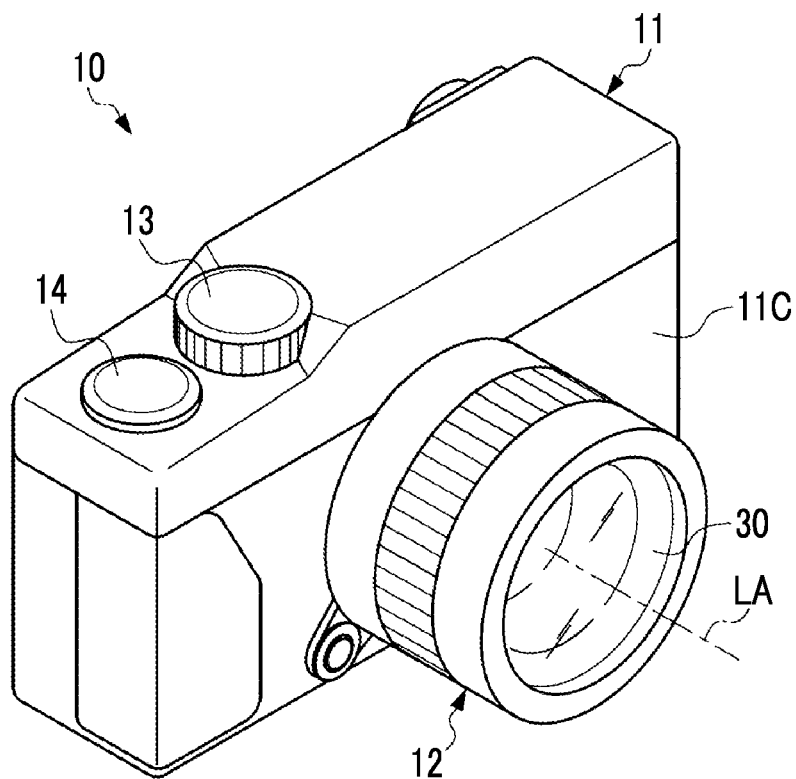
FIG. 1 is a schematic perspective view showing an example of a front side of an imaging apparatus.

FIG. 1 shows an example of a front side of an imaging apparatus 10. As shown in FIG. 1, the imaging apparatus 10 is an interchangeable lens digital camera. The imaging apparatus 10 is composed of a body 11 and an imaging lens 12 which is interchangeably mounted on the body 11. The imaging lens 12 is mounted on the front surface 11C side of the body 11 through the camera side mount 11A and the lens side mount 12A (refer to FIG. 3). The imaging lens 12 is an example of a lens according to the technique of the present disclosure.

A dial 13 and a release button 14 are provided on an upper surface of the body 11. The dial 13 is operated in a case of setting the operation mode or the like. Examples of the operation mode of the imaging apparatus 10 include a still picture imaging mode, a motion picture imaging mode, and an image display mode. The release button 14 is operated by a user at the time of starting execution of the still picture imaging or the motion picture imaging.

Figure 2:
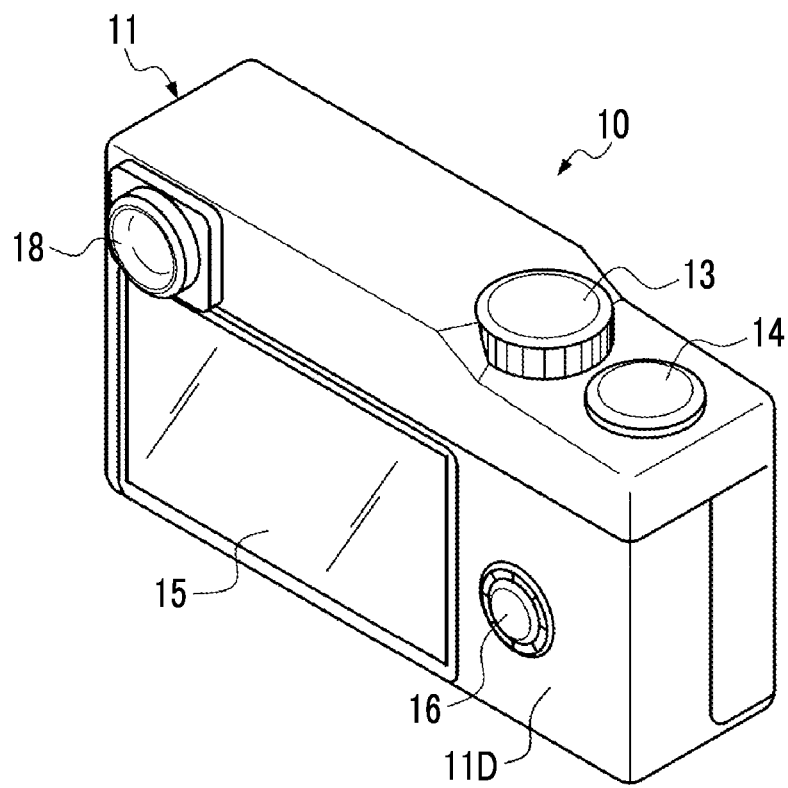
FIG. 2 is a schematic perspective view showing an example of a rear side of the imaging apparatus.

FIG. 2 shows an example of the rear side of the imaging apparatus 10. As shown in FIG. 2, a display 15, an instruction button 16, and a finder eyepiece portion 18 of a finder not shown in the drawing are provided on the rear surface 11D of the body 11. As the finder, an optical view finder or an electronic view finder can be adopted. The display 15 displays an image on the basis of an image signal obtained by imaging, various menu screens, and the like. The instruction button 16 receives various instructions.

Figure 3:
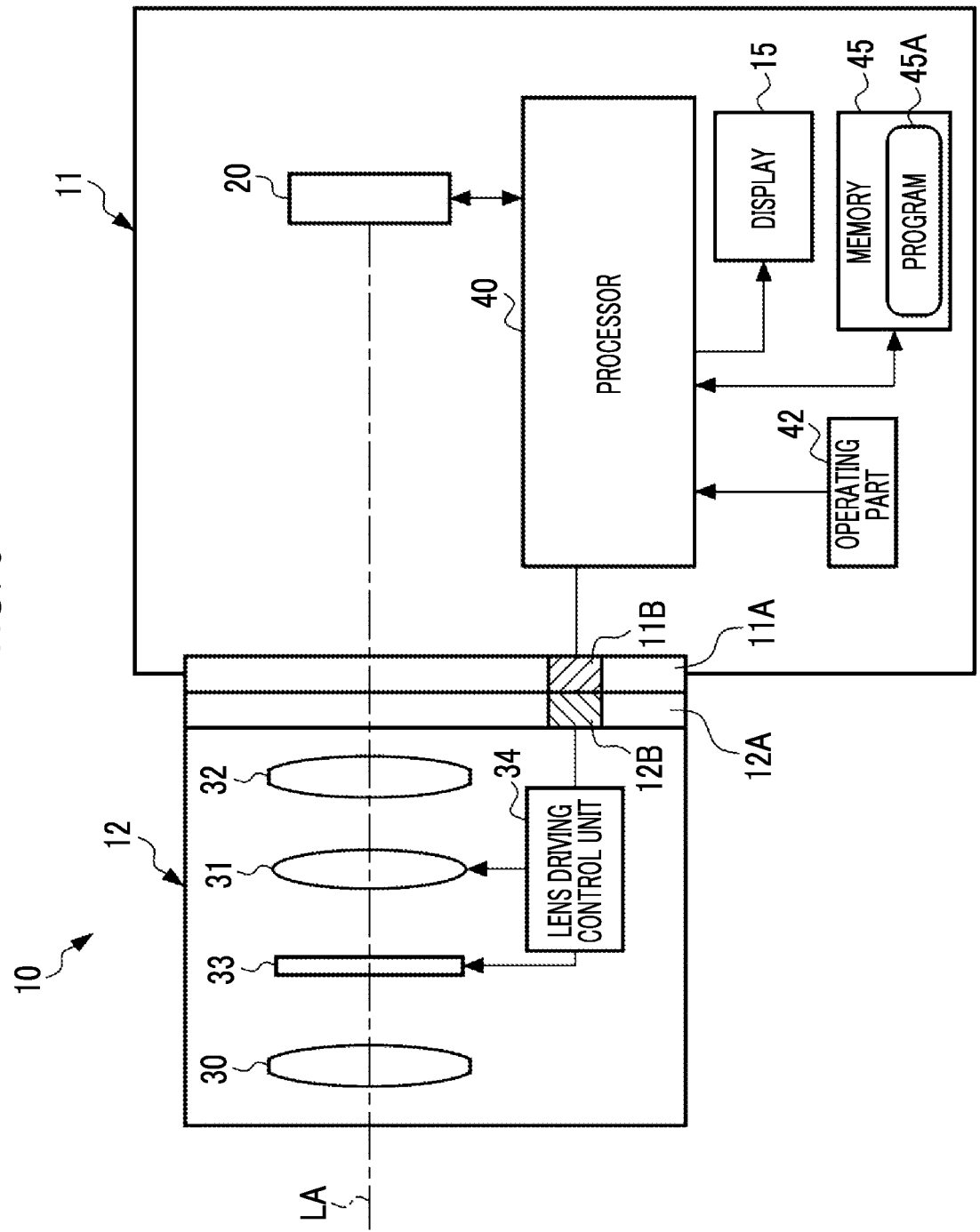
FIG. 3 is a diagram showing an example of an internal configuration of the imaging apparatus.

FIG. 3 shows an example of an internal configuration of the imaging apparatus 10. The body 11 and the imaging lens 12 are electrically connected to each other by bringing an electrical contact 11B provided on a camera side mount 11A into contact with an electrical contact 12B provided on a lens side mount 12A.

The imaging lens 12 includes an objective lens 30, a focus lens 31, a rear end lens 32, and a stop 33. Each member is disposed in the order of the objective lens 30, the stop 33, the focus lens 31, and the rear end lens 32 from the objective side along an optical axis LA of the imaging lens 12. The objective lens 30, the focus lens 31, the rear end lens 32, and an imaging optical system are configured. The type, number, and arrangement order of the lenses constituting the imaging optical system are not limited to the example shown in FIG. 3.

Further, the imaging lens 12 has a lens driving control unit 34. The lens driving control unit 34 is composed of, for example, a CPU, a RAM, a ROM, or the like. The ROM also includes a rewritable EEPROM, a flash memory, and the like. The lens driving control unit 34 is electrically connected to a processor 40 in the body 11 through the electrical contact 12B and the electrical contact 11B.

The lens driving control unit 34 drives the focus lens 31 and the stop 33 on the basis of a control signal which is transmitted from the processor 40. In order to adjust focus of the imaging lens 12, the lens driving control unit 34 performs driving control of the focus lens 31 on the basis of a control signal for focus adjustment transmitted from the processor 40. The processor 40 performs the focus adjustment of a phase difference method.

The body 11 is provided with an imaging sensor 20, a processor 40, an operating part 42, a memory 45, and a display 15. The processor 40 controls operations of the imaging sensor 20, the memory 45, and the display 15. The processor 40 is composed of, for example, a CPU, a RAM, a ROM, or the like. In such a case, the processor 40 executes various kinds of processing on the basis of a program 45A stored in the memory 45. The processor 40 may be composed of an aggregate of a plurality of IC chips. In addition, the imaging sensor 20 is, for example, a CMOS image sensor. The imaging sensor 20 is an example of the "imaging element" according to the technique of the present disclosure.

Figure 4:
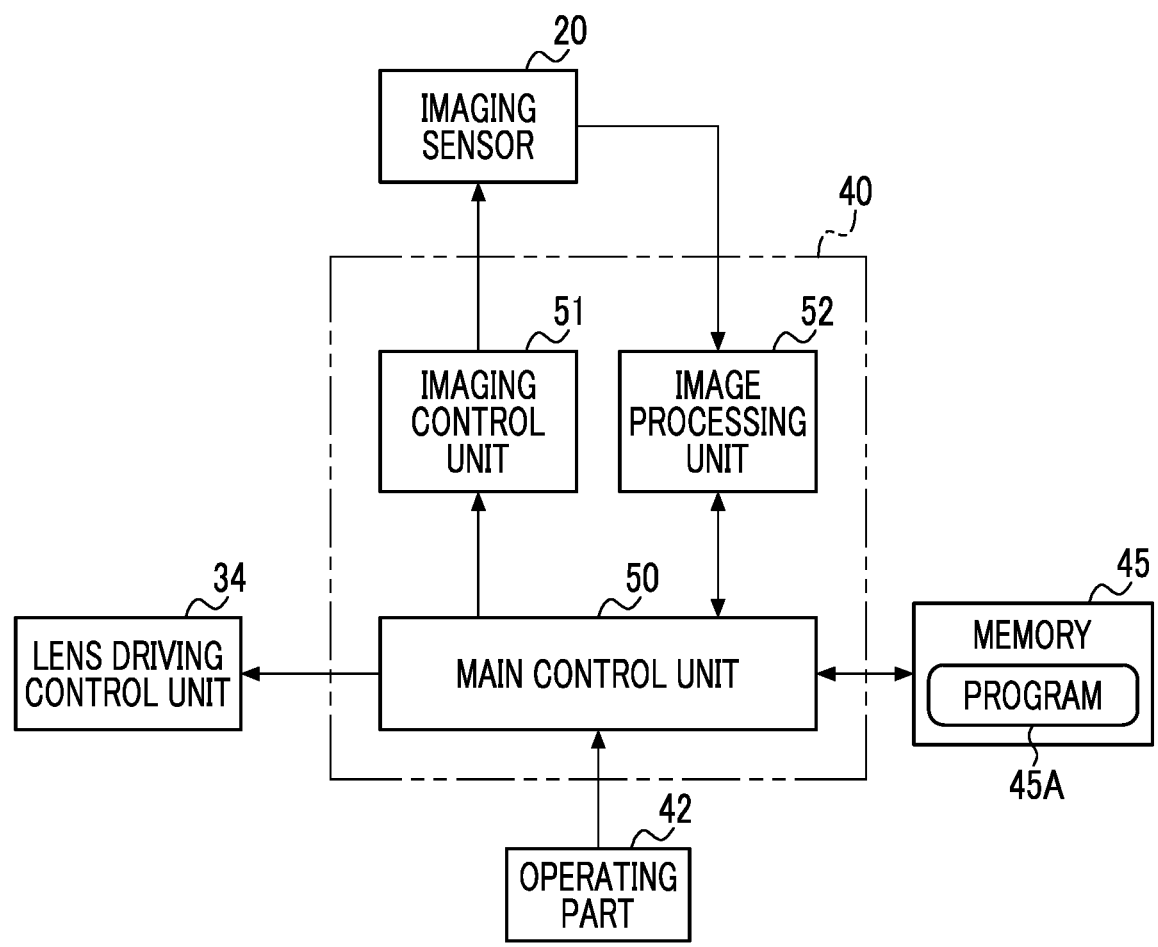
FIG. 4 is a block diagram showing an example of a functional configuration of a processor.

The display 15 displays an image on the basis of the image data generated by the image processing unit 52 (refer to FIG. 4). The image includes a still picture, a motion picture, and a live view image. The live view image is an image that is displayed in real time on the display 15 by sequentially outputting the image data, which is generated by the image processing unit 52, to the display 15.

The image data, which is generated by the image processing unit 52, can be stored in an internal memory (not shown in the drawing) built in the body 11 or a storage medium (for example, the memory card) that can be attached to and detached from the body 11.

The operating part 42 includes the dial 13, the release button 14, and the instruction button 16 (refer to FIGS. 1 and 2) described above. The processor 40 controls each unit in the body 11 and the lens driving control unit 34 in the imaging lens 12 in response to an operation of the operating part 42.

(Processor Configuration)

FIG. 4 shows an example of a functional configuration of the processor 40. The processor 40 implements various functional units by executing processing in accordance with the program 45A stored in the memory 45. As shown in FIG. 4, for example, a main control unit 50, an imaging control unit 51, and an image processing unit 52 are implemented in the processor 40.

The main control unit 50 comprehensively controls an operation of the imaging apparatus 10 on the basis of an instruction signal which is input from the operating part 42. The imaging control unit 51 controls the imaging sensor 20 to execute an imaging processing of causing the imaging sensor 20 to perform an imaging operation. The imaging control unit 51 drives the imaging sensor 20 in the still picture imaging mode or the motion picture imaging mode.

A user is able to perform selection between the still picture imaging mode and the motion picture imaging mode by the operating part 42. Further, a user is able to set the exposure value including the shutter speed and the F number by operating the operating part 42.

Further, a user is able to select an automatic exposure mode by operating the operating part 42. In a case in which the automatic exposure mode is selected, the main control unit 50 obtains optimum values of the shutter speed and the F number by calculation using the program diagram and the luminance of the image signal obtained by the imaging sensor 20.

The image processing unit 52 performs various kinds of image processing on the image signal to generate image data in a predetermined file format (for example, JPEG format or the like).

(Configuration of Imaging Sensor)

Figure 5:
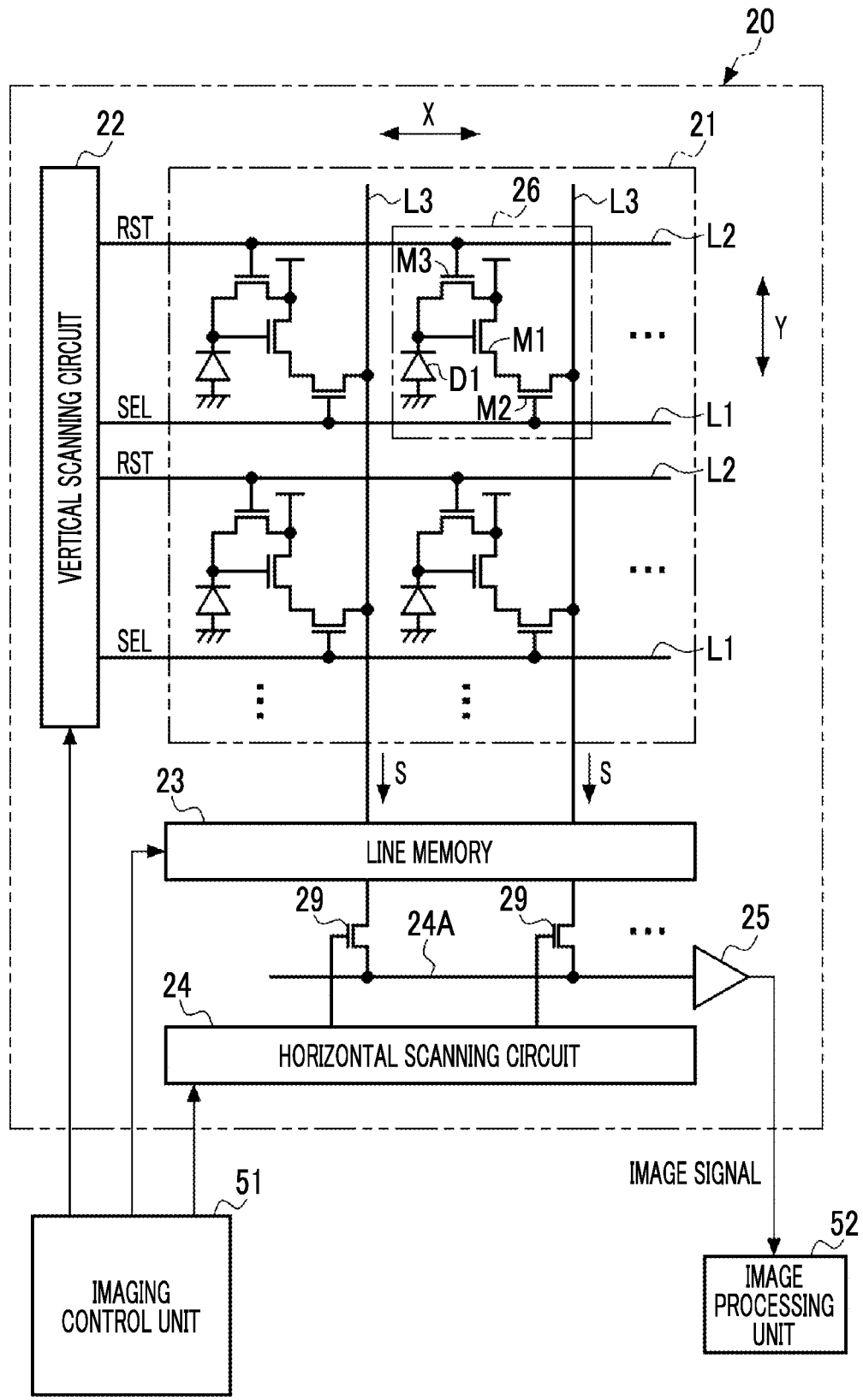
FIG. 5 is a diagram showing an example of a configuration of an imaging sensor.

FIG. 5 shows an example of a configuration of the imaging sensor 20. The imaging sensor 20 shown in FIG. 5 is a CMOS image sensor. The imaging sensor 20 includes the imaging region 21, a vertical scanning circuit 22, a line memory 23, a horizontal scanning circuit 24, and an output amplifier 25.

In the imaging region 21, a plurality of pixels 26 are arranged in a two-dimensional matrix along the X direction and the Y direction. Further, in the imaging region 21, a plurality of row selection lines L1 and a plurality of row reset lines L2 are wired along the X direction, and a plurality of column signal lines L3 are wired along the Y direction.

The column signal line L3 extends in the Y direction. The row selection line L1 and the row reset line L2 extend in the X direction intersecting with the Y direction. The Y direction is an example of the "first direction" according to the technique of the present disclosure. The X direction is an example of the "second direction" according to the technique of the present disclosure.

The pixel 26 is connected to the row selection line L1, the row reset line L2, and the column signal line L3. Hereinafter, a plurality of pixels 26 arranged in the X direction may be simply referred to as "row". Although details will be described later, some of the plurality of pixels 26 are the phase difference pixels for performing focus adjustment.

The pixel 26 has a photodiode D1, an amplifier transistor M1, a pixel selection transistor M2, and a reset transistor M3. The photodiode D1 performs photoelectric conversion of incident light to generate a signal charge corresponding to an amount of the incident light and accumulate the generated signal charge. The amplifier transistor M1 generates a voltage (hereinafter referred to as a pixel signal S) corresponding to an amount of the signal charge accumulated in the photodiode D1.

The pixel selection transistor M2 is controlled by the vertical scanning circuit 22 through the row selection line L1 and outputs the pixel signal S, which is generated by the amplifier transistor M1, to the column signal line L3. The reset transistor M3 is controlled by the vertical scanning circuit 22 through the row reset line L2, and discards the signal charge, which is accumulated in the photodiode D1, to the power supply line. Hereinafter, discarding of the signal charge from the photodiode D1 is referred to as reset of the pixel 26.

The vertical scanning circuit 22 generates a row selection signal SEL and a reset signal RST on the basis of the vertical synchronization signal which is input from the imaging control unit 51. In the signal readout operation, the vertical scanning circuit 22 provides the row selection signal SEL to the row selection line L1 to output the pixel signal S from the pixel 26, which is connected to the row selection line L1, to the column signal line L3.

Further, the vertical scanning circuit 22 resets the pixel 26, which is connected to the row reset line L2, by giving the reset signal RST to the row reset line L2 during the reset operation. For example, the pixel 26 connected to the row reset line L2 in the nth row is reset while the pixel signal S is being read out from the pixel 26 which is connected to the row selection line L1 in the n+1th row.

The line memory 23 stores the pixel signal S which is output from the pixel 26 for one line. The line memory 23 is constituted of a capacitor or the like. The line memory 23 is connected to the horizontal output line 24A through a transistor 29 as a switch. The output amplifier 25 is connected to the end of the horizontal output line 24A. The horizontal scanning circuit 24 sequentially outputs the pixel signals S for one line stored in the line memory 23 to the horizontal output line 24A by performing horizontal scanning in which the transistors 29 are sequentially selected. The pixel signal S, which is output to the horizontal output line 24A, is output to the external image processing unit 52 as an image signal through the output amplifier 25.

The imaging control unit 51 controls operations of the vertical scanning circuit 22, the line memory 23, and the horizontal scanning circuit 24 (refer to FIG. 4). The imaging control unit 51 controls the vertical scanning circuit 22 to output the pixel signal S while sequentially selecting the row selection line L1 one row at a time. Further, the imaging control unit 51 controls the vertical scanning circuit 22 to reset the pixels 26 while sequentially selecting the row reset line L2 one row at a time.

Figure 10:
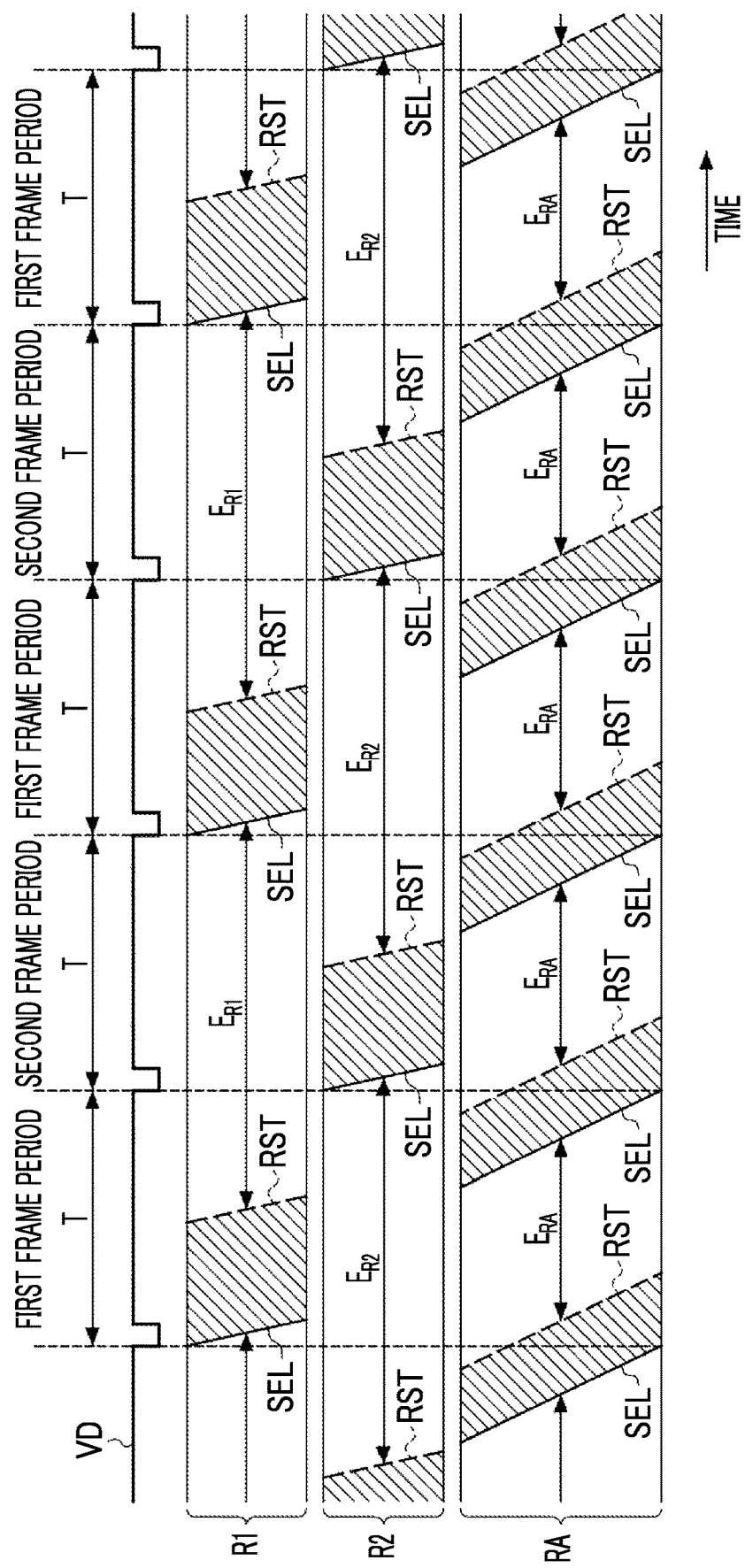
FIG. 10 is a diagram showing an example of imaging timing.

In the motion picture imaging mode, the imaging control unit 51 drives the imaging sensor 20 in a frame cycle T (refer to FIG. 10). The imaging control unit 51 causes the imaging sensor 20 to repeatedly execute operations of reading out and resetting the image signal in a frame cycle corresponding to the frame rate.

The configuration of the imaging sensor 20 is not limited to the configuration shown in FIG. 5. For example, the imaging sensor 20 may be provided with an A/D converter.

(Configuration of Pixels)

Figure 6:
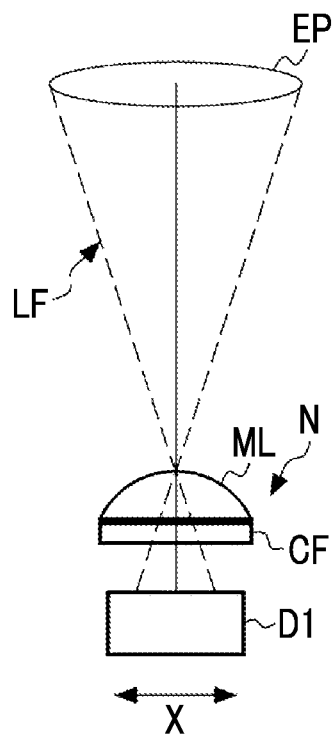
FIG. 6 is a diagram showing an example of a configuration of imaging pixels.
Figure 7:
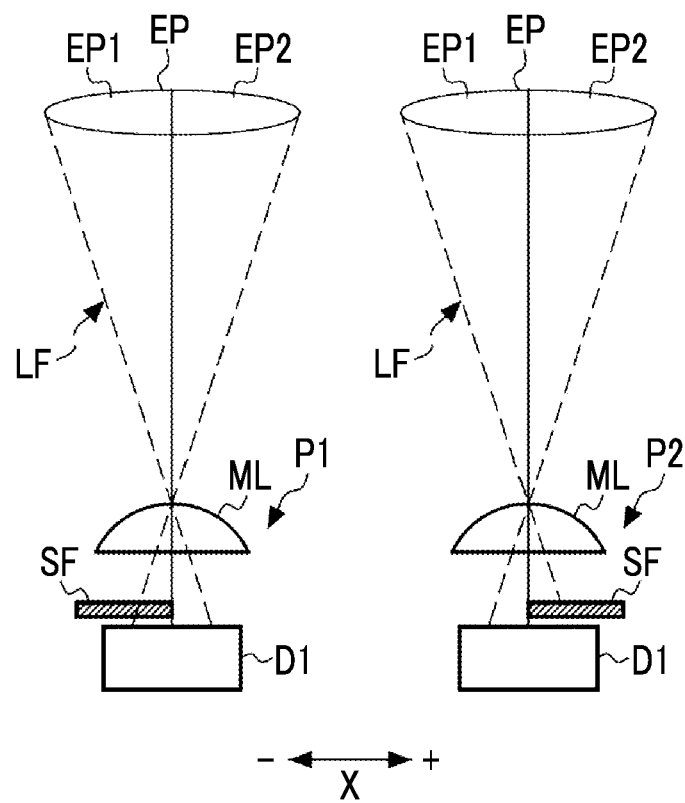
FIG. 7 is a diagram showing an example of a configuration of phase difference pixels.

The plurality of pixels 26, which are arranged in the imaging region 21, include imaging pixels N for imaging and phase difference pixels P1 and P2. FIG. 6 shows an example of a configuration of the imaging pixel N. FIG. 7 shows an example of configurations of the phase difference pixels P1 and P2. Each of the phase difference pixels P1 and P2 receives one of luminous flux which is split in the X direction about the principal ray as a center.

As shown in FIG. 6, the imaging pixel N is configured to include a photodiode D1 as a photoelectric conversion element, a color filter CF, and a microlens ML. The color filter CF is disposed between the photodiode D1 and the microlens ML.

The color filter CF is a filter that transmits light of any of red (R), green (G), and blue (B). The microlens ML concentrates a luminous flux LF incident from an exit pupil EP of the imaging lens 12 to substantially the center of the photodiode D1 through the color filter CF.

As shown in FIG. 7, each of the phase difference pixels P1 and P2 is configured to include a photodiode D1, a light blocking layer SF, and a microlens ML. Similarly to the imaging pixel N, the microlens ML concentrates the luminous flux LF incident from the exit pupil EP of the imaging lens 12 on the substantially center of the photodiode D1.

The light blocking layer SF is formed of a metal film or the like and is disposed between the photodiode D1 and the microlens ML. The light blocking layer SF blocks a part of the luminous flux LF incident on the photodiode D1 through the microlens ML from light blocking.

In the phase difference pixel P1, the light blocking layer SF blocks a negative side (first side) in the X direction with respect to the center of the photodiode D1 as a reference. That is, in the phase difference pixel P1, the light blocking layer SF makes the luminous flux LF from the first-side exit pupil EP1 incident on the photodiode D1 and blocks the luminous flux LF from the positive-side (second-side) exit pupil EP2 in the X direction.

In the phase difference pixel P2, the light blocking layer SF blocks light from the positive-side (second side) in the X direction with respect to the center of the photodiode D1. That is, in the phase difference pixel P2, the light blocking layer SF makes the luminous flux LF from the second-side exit pupil EP2 incident on the photodiode D1 and blocks the luminous flux LF from the negative-side (first-side) exit pupil EP1 in the X direction.

(Pixel Array)

Figure 8:
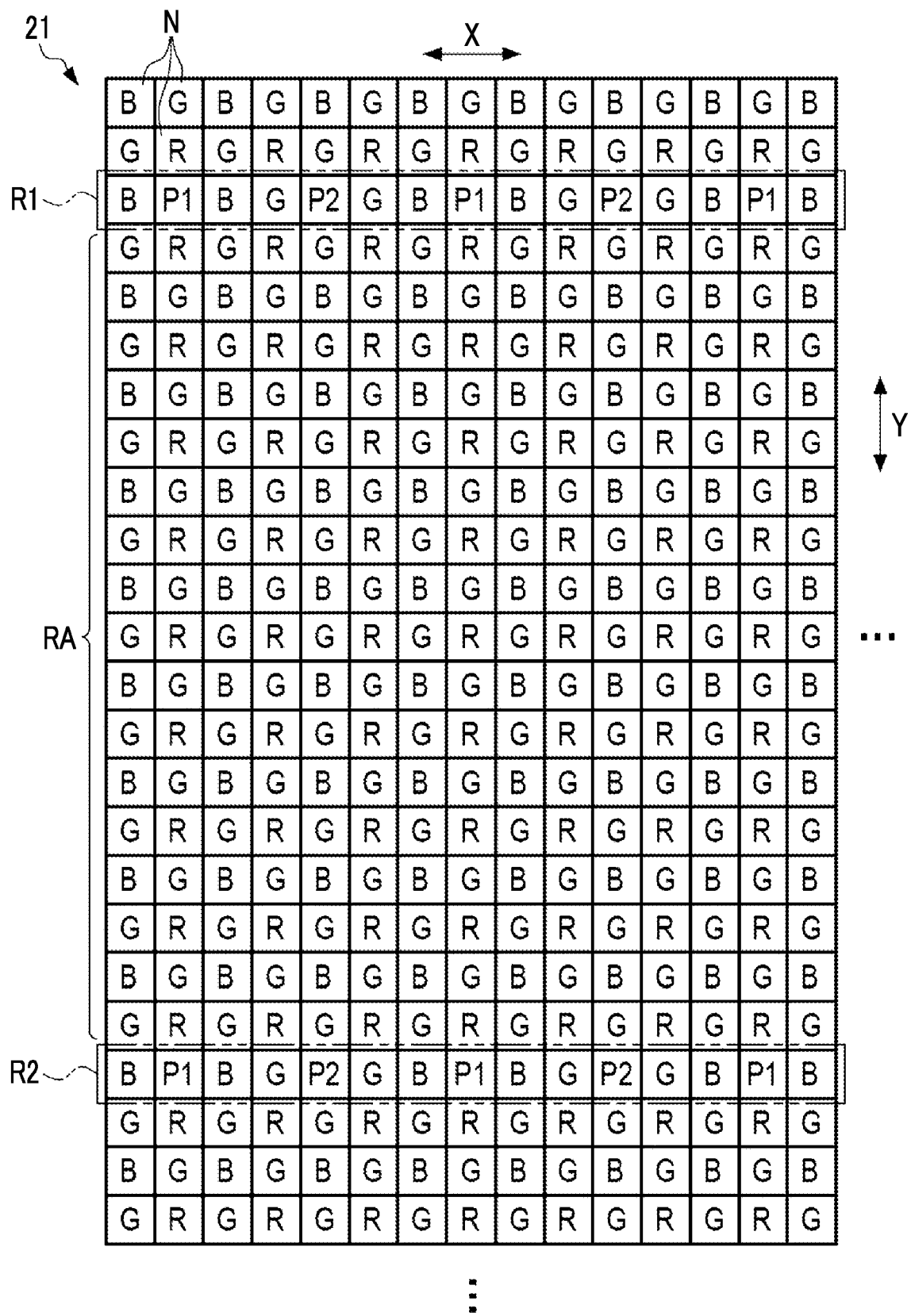
FIG. 8 is a diagram showing an example of pixel array of the imaging sensor.

FIG. 8 shows an example of pixel array of the imaging sensor 20. The color array of the color filters CF shown in FIG. 8 is a so-called Bayer array. The Bayer array is a color array in which a color filter CF of G is disposed on two diagonal pixels of four pixels of 2×2, and color filters CF of R and B are disposed on the other two pixels. The "R" in FIG. 8 indicates the imaging pixel N provided with the color filter CF of R. The "G" indicates the imaging pixel N provided with the color filter CF of G. The "B" indicates the imaging pixel N provided with the color filter CF of B. The color array of the color filter CF is not limited to the Bayer array and may be another color array.

The phase difference pixels P1 and P2 are disposed in the imaging region 21 by replacing a part of the imaging pixels N in the Bayer array. The phase difference pixels P1 and P2 are arranged in the X direction. For example, either of the phase difference pixels P1 and P2 is disposed every three pixels (that is, every two pixels) in the X direction. That is, two imaging pixels N (B and G) are disposed between the phase difference pixel P1 and the phase difference pixel P2.

The phase difference pixels P1 and P2 are arranged every 18 pixels in the Y direction. The plurality of imaging pixels N (R and G) are arranged between the phase difference pixels P1 arranged in the Y direction. The plurality of imaging pixels N (B and G) are arranged between the phase difference pixels P2 arranged in the Y direction.

The array pattern of the phase difference pixels P1 and P2 is not limited to the example shown in FIG. 8. For example, the phase difference pixels P1 and P2 may be disposed adjacent in the X direction.

The reference numeral R1 indicates a first phase difference pixel region in which the plurality of phase difference pixels P1 and P2 are arranged in the X direction. Similarly, the reference numeral R2 indicates a first phase difference pixel region in which the plurality of phase difference pixels P1 and P2 are arranged in the X direction. The first phase difference pixel region R1 and the second phase difference pixel region R2 are arranged in the Y direction with an imaging pixel region RA, which includes only the imaging pixels N, interposed therebetween.

The first phase difference pixel region R1 and the second phase difference pixel region R2 have the same pixel configurations. In the motion picture imaging mode, the first phase difference pixel region R1 and the second phase difference pixel region R2 are scanned at different timings by the vertical scanning circuit 22, and signals are not read out in the same frame cycle (refer to FIG. 10). That is, the first phase difference pixel region R1 and the second phase difference pixel region R2 alternately read out signals for each frame cycle, in the interlaced readout method.

Figure 9:
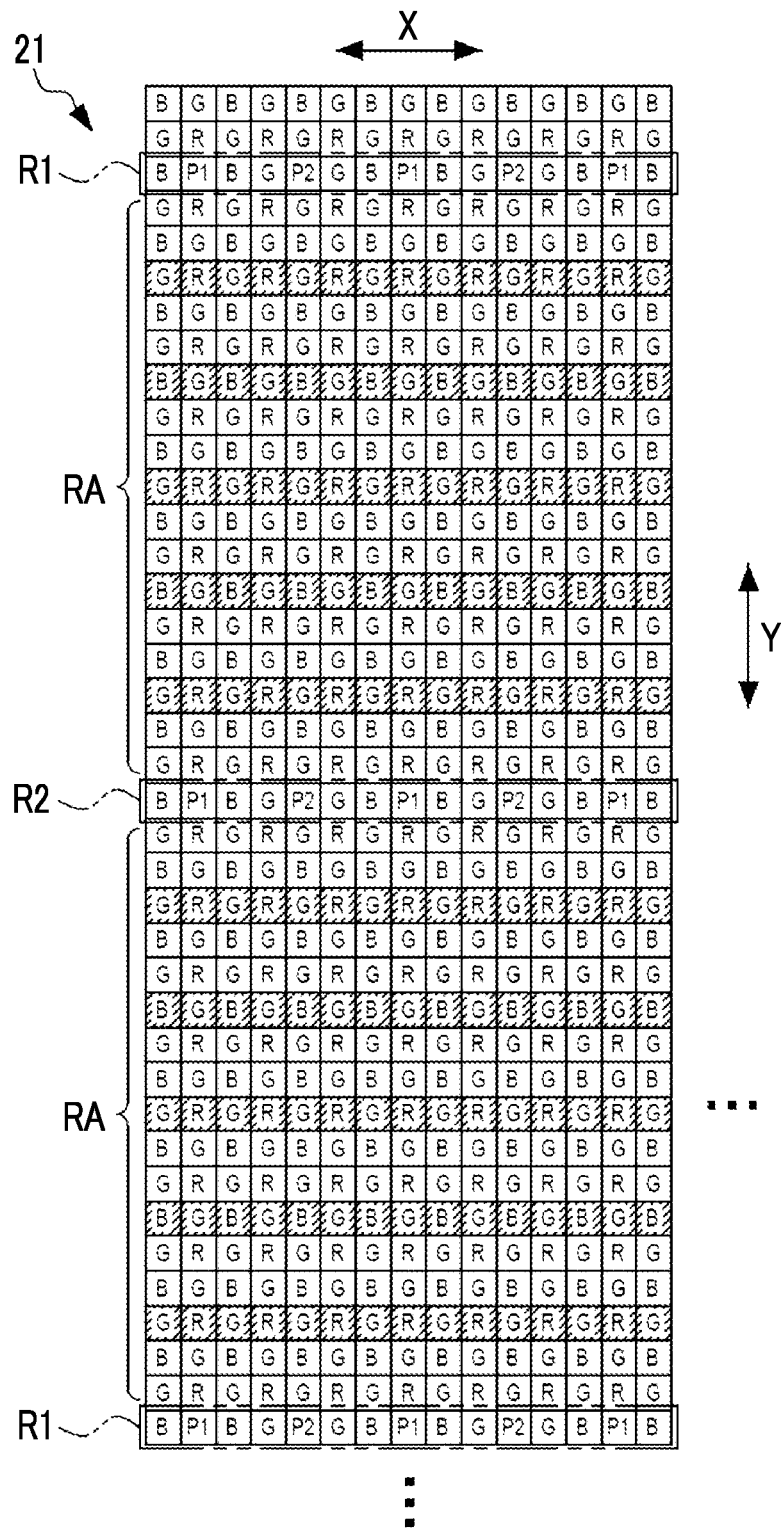
FIG. 9 is a diagram showing pixels from which signals are read out in a motion picture imaging mode.

FIG. 9 shows pixels from which signals are read out in a motion picture imaging mode. The first phase difference pixel region R1 and the second phase difference pixel region R2 are alternately arranged in the Y direction with the imaging pixel region RA interposed therebetween. In the motion picture imaging mode, the imaging pixel region RA, the first phase difference pixel region R1, and the second phase difference pixel region R2 are reset and the signal readout is performed independently of each other.

In the present embodiment, the pixel thinning-out readout is performed in the imaging pixel region RA. In the imaging pixel region RA, pixels are thinned out every three rows. In FIG. 9, the hatched pixels are pixels in which the signal readout is not performed.

(Imaging Timing)

FIG. 10 shows an example of the imaging timing of the imaging sensor 20 in the motion picture imaging mode. A frame cycle T of the motion picture imaging is defined by the vertical synchronization signal VD supplied from the imaging control unit 51 to the vertical scanning circuit 22. The vertical scanning circuit 22 independently supplies the row selection signal SEL and the reset signal RST for the imaging pixel region RA, the first phase difference pixel region R1, and the second phase difference pixel region R2, on the basis of the vertical synchronization signal VD.

The vertical scanning circuit 22 supplies the row selection signal SEL to the imaging pixel region RA, the first phase difference pixel region R1, and the second phase difference pixel region R2, in synchronization with the vertical synchronization signal VD. The vertical scanning circuit 22 supplies the row selection signal SEL to the imaging pixel region RA for each frame cycle T. The vertical scanning circuit 22 supplies the row selection signal SEL to the first phase difference pixel region R1 and the second phase difference pixel region R2 in a cycle twice the frame cycle T (a period twice the frame cycle T). The phases of the row selection signal SEL supplied to the first phase difference pixel region R1 and the row selection signal SEL supplied to the second phase difference pixel region R2 are shifted by the frame cycle T.

The vertical scanning circuit 22 supplies the reset signal RST, in accordance with the exposure time of each of the imaging pixel region RA, the first phase difference pixel region R1. and the second phase difference pixel region R2. Each of the exposure times is a time (that is, a charge accumulation time) from the input of the reset signal RST to the input of the row selection signal SEL for each row. The exposure period shifts for each row. That is, the imaging sensor 20 performs exposure with the focal plane type electronic shutter. It should be noted that periods in which the hatching is applied in FIG. 10 are light blocking periods. The reset may be repeatedly executed in the light blocking periods.

In the imaging pixel region RA, the signal readout is performed for each frame cycle T. Therefore, an exposure time $E_{RA}$ (hereinafter referred to as the exposure time for imaging) of the imaging pixel region RA is set to be less than the frame cycle T (that is, $E_{RA} < T$). For example, the imaging exposure time $E_{RA}$ corresponds to a shutter speed which is set by an operation of the operating part 42. Further, the imaging exposure time $E_{RA}$ corresponds to the shutter speed which is determined by the automatic exposure mode.

The signals of the first phase difference pixel region R1 are read out in the cycle twice the frame cycle T. Therefore, an exposure time $E_{R1}$ (hereinafter referred to as the first exposure time) of the first phase difference pixel region R1 is set to be less than twice the frame cycle T (that is, $E_{R1} < 2T$). For example, the first exposure time $E_{R1}$ is a fixed value. The first exposure time $E_{R1}$ may be a value that varies in conjunction with the imaging exposure time $E_{RA}$. The first exposure time $E_{R1}$ is different from the imaging exposure time $E_{RA}$, and is set to a value that satisfies a relationship of, for example, $E_{RA}<E_{R1}<2T$.

Similarly to the first phase difference pixel region R1, the second phase difference pixel region R2 reads out the signal in the cycle twice the frame cycle T. Therefore, the exposure time $E_{R2}$ (hereinafter referred to as the second exposure time) of the second phase difference pixel region R2 is set to be less than twice the frame cycle T (that is, $E_{R2}<2T$). For example, the second exposure time $E_{R2}$ is a fixed value. The second exposure time $E_{R2}$ may be a value that varies in conjunction with the imaging exposure time $E_{RA}$. The second exposure time $E_{R2}$ is different from the imaging exposure time $E_{RA}$, and is set to a value that satisfies a relationship of, for example, $E_{RA}<E_{R2}<2T$.

In the present embodiment, the first exposure time $E_{R1}$ is equal to the second exposure time $E_{R2}$ (that is, $E_{R1}=E_{R2}$). Further, each of the first exposure time $E_{R1}$ and the second exposure time $E_{R2}$ is equal to or greater than the frame cycle T (that is, $T \leq E_{R1}$ and $T \leq E_{R2}$). The first exposure time $E_{R1}$ and the second exposure time $E_{R2}$ may be different from each other.

As shown in FIG. 10, the period of reading out a signal from the first phase difference pixel region R1 is defined as a first frame period, and the period of reading out a signal from the second phase difference pixel region R2 is defined as a second frame period. The signal readout from the imaging pixel region RA is performed in either frame period of the first frame period and the second frame period. In the present embodiment, the signal readout from the second phase difference pixel region R2 in the second frame period starts immediately after the signal readout from the imaging pixel region RA ends in the first frame period. Further, immediately after the signal readout from the imaging pixel region RA ends in the second frame period, the signal readout from the first phase difference pixel region R1 in the first frame period starts.

(Focus Adjustment Control)

Figure 11:
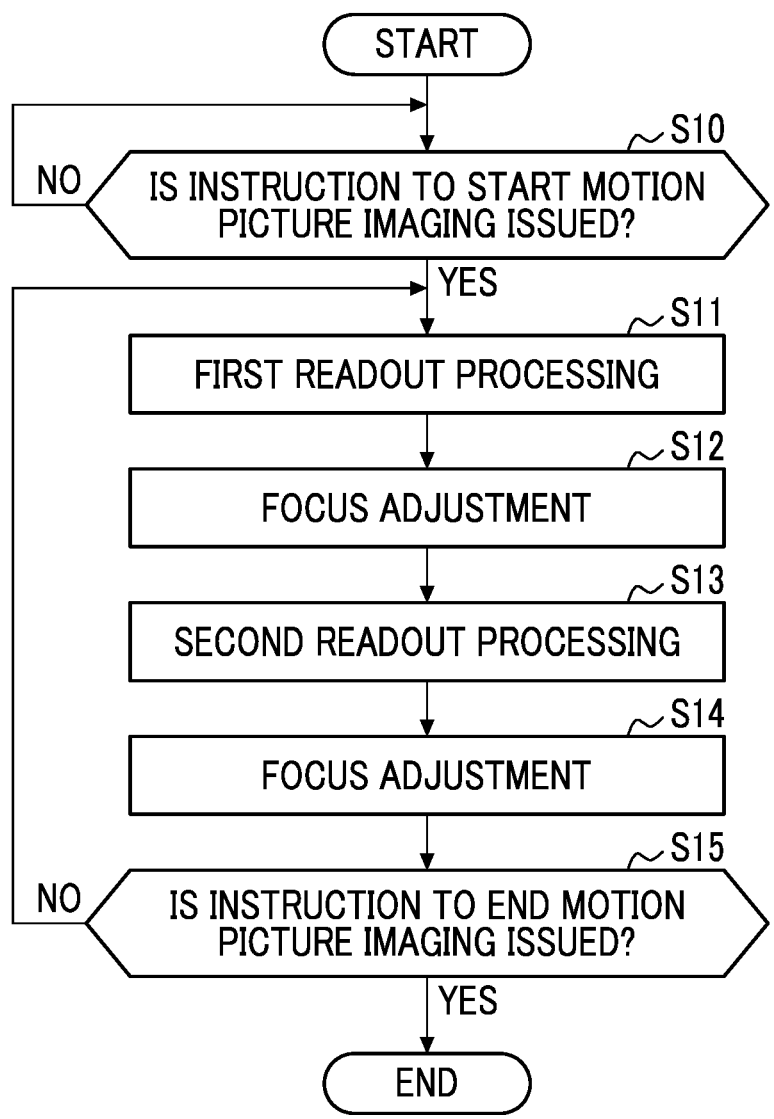
FIG. 11 is a flowchart showing an example of focus adjustment control.

Next, focus adjustment control in the motion picture imaging mode will be described with reference to the flowchart shown in FIG. 11. First, the main control unit 50 determines whether or not an instruction to start the motion picture imaging is issued through the operation of the operating part 42 (step S10).

In a case where the main control unit 50 determines that an instruction to start the motion picture imaging is issued (step S10: YES), the main control unit 50 controls the imaging control unit 51 to cause the imaging sensor 20 to perform an imaging operation in the frame cycle T, and executes the first readout processing (step S11). The first readout processing is processing of reading out a signal from the first phase difference pixel region R1 during the first frame period.

After the first readout processing ends, the main control unit 50 performs the focus adjustment of the phase difference method, on the basis of the signals which are output from the phase difference pixels P1 and P2 included in the first phase difference pixel region R1 (step S12). Specifically, the main control unit 50 adjusts a position of the focus lens 31 so as to reduce a phase difference between an image based on the signal which is output from the phase difference pixel P1 and an image based on the signal which is output from the phase difference pixel P2.

Then, the main control unit 50 causes the imaging sensor 20 to execute the second readout processing (step S13). The second readout processing is processing of reading out a signal from the second phase difference pixel region R2 during the second frame period subsequent to the first frame period.

After the second readout processing ends, the main control unit 50 performs the focus adjustment of the phase difference method, on the basis of the signals which are output from the phase difference pixels P1 and P2 included in the second phase difference pixel region R2 (step S14). The processing of step S14 is similar to the processing of step S12.

Next, the main control unit 50 determines whether or not an instruction to end the motion picture imaging is issued through the operation of the operating part 42 (step S15). In a case where the main control unit 50 determines that no instruction to end the motion picture imaging is issued (step S15: NO), the main control unit 50 advances the processing to step S11 and causes the imaging sensor 20 to execute the first readout processing. In contrast, in a case where the main control unit 50 determines that the instruction to end the motion picture imaging is issued (step S15: YES), the main control unit 50 ends the processing.

As described above, in the focus adjustment control of the present embodiment, the first readout processing and the second readout processing are repeatedly executed. In the present embodiment, the first phase difference pixel region R1 and the second phase difference pixel region R2 read out signals independently in the cycle twice the frame cycle T. Therefore, the first exposure time $E_{R1}$ and the second exposure times $E_{R2}$ can each be set to be equal to or greater than the frame cycle T (that is, $T \leq E_{R1}$ and $T \leq E_{R2}$). Consequently, according to the present embodiment, the exposure time of the phase difference pixels P1 and P2 is set to be equal to or greater than the frame cycle T, and the signal can be read out from the phase difference pixels P1 and P2 for each frame cycle T.

Since the phase difference pixels P1 and P2 each have a light blocking layer SF, the amount of light received is less than that of the imaging pixel N (refer to FIGS. 6 and 7). Assuming that the first exposure time $E_{R1}$ and the second exposure time $E_{R2}$ are each equal to the imaging exposure time $E_{RA}$, the light receiving amount of the phase difference pixels P1 and P2 is small. Therefore, the accuracy of the focus adjustment is lowered. Meanwhile, according to the present embodiment, the first exposure time $E_{R1}$ and the second exposure time $E_{R2}$ can be set to be longer than the imaging exposure time $E_{RA}$, and can be set to be longer than the frame cycle T, respectively. Therefore, the amount of light received by the phase difference pixels P1 and P2 is increased. In such a manner, the accuracy of the focus adjustment is improved. The first embodiment is particularly appropriate for a case where the exposure time for imaging is short (that is, the set frame rate is high or the shutter speed is fast).

The focus adjustment is not limited to the motion picture imaging mode in which the motion picture data is recorded in the memory 45 or the like, and can also be applied to a live view display mode in which the motion picture data is displayed in real time on the display 15 or the finder without being recorded.

Second Embodiment

Next, a second embodiment will be described. In the second embodiment, the focus adjustment control in the motion picture imaging mode is different from that in the first embodiment.

Figure 12:
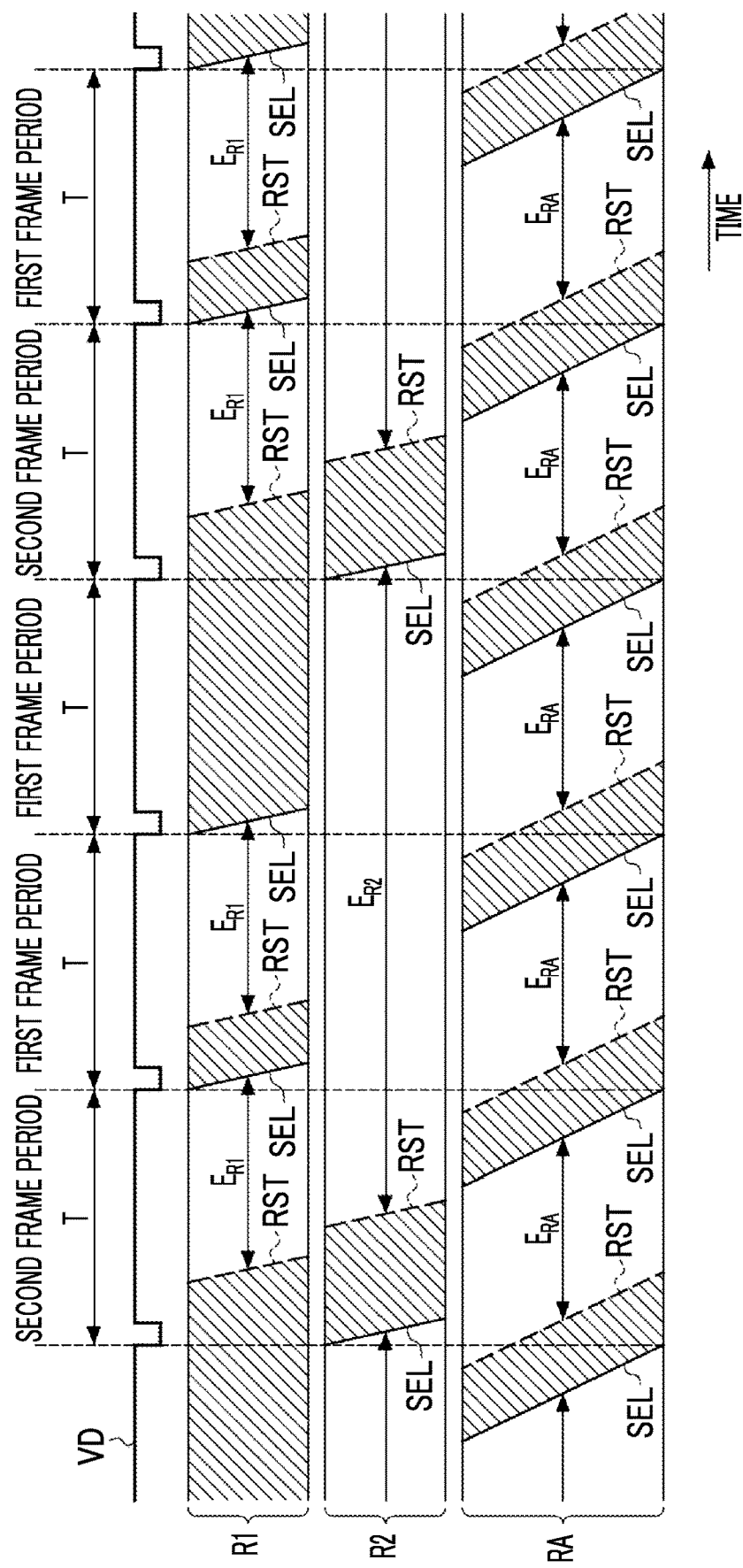
FIG. 12 is a diagram showing an example of imaging timing according to a second embodiment.

FIG. 12 shows an example of imaging timing in the motion picture imaging mode according to the second embodiment. In the present embodiment, on the basis of the control of the main control unit 50, the imaging sensor 20 executes the above-mentioned first readout processing twice, and executes the above-mentioned second readout processing once each time the first readout processing is executed twice. Therefore, in the present embodiment, the two first frame periods are continued after the second frame period.

In the present embodiment, the second exposure time $E_{R2}$ is equal to or greater than twice the frame cycle T and less than 3 times the frame cycle T (that is, $2T \leq E_{R2} < 3T$), and the first readout processing is executed twice during the exposure period of the second phase difference pixel region R2. Further, the first exposure time $E_{R1}$ is less than the frame cycle T.

As described above, in the present embodiment, it is possible to acquire a signal from the first phase difference pixel region R1 exposed in the first exposure time $E_{R1}$ less than the frame cycle T and a signal from the second phase difference pixel region R2 exposed in the second exposure time $E_{R2}$ equal to or greater than twice the frame cycle T. In the present embodiment, the main control unit 50 is able to perform focus adjustment control in accordance with the brightness of the subject, on the basis of the signals of the phase difference pixels P1 and P2 having significantly different exposure times.

The main control unit 50 may perform focus adjustment by selecting either a long-time exposure signal or a short-time exposure signal in accordance with the brightness of the subject. Further, the main control unit 50 may perform focus adjustment, on the basis of the addition signals of the long-time exposure signal and the short-time exposure signal. The brightness of the subject may be detected on the basis of signals which are read out from the imaging pixel region RA. It is desired that the focus adjustment control of the present embodiment is executed in a case where the brightness of the subject is large (that is, the dynamic range is wide).

It should be noted that, in FIG. 12, two consecutive first exposure times $E_{R1}$ are equal, but one of the two first exposure times $E_{R1}$ can be set to be longer than the other.

Figure 13:
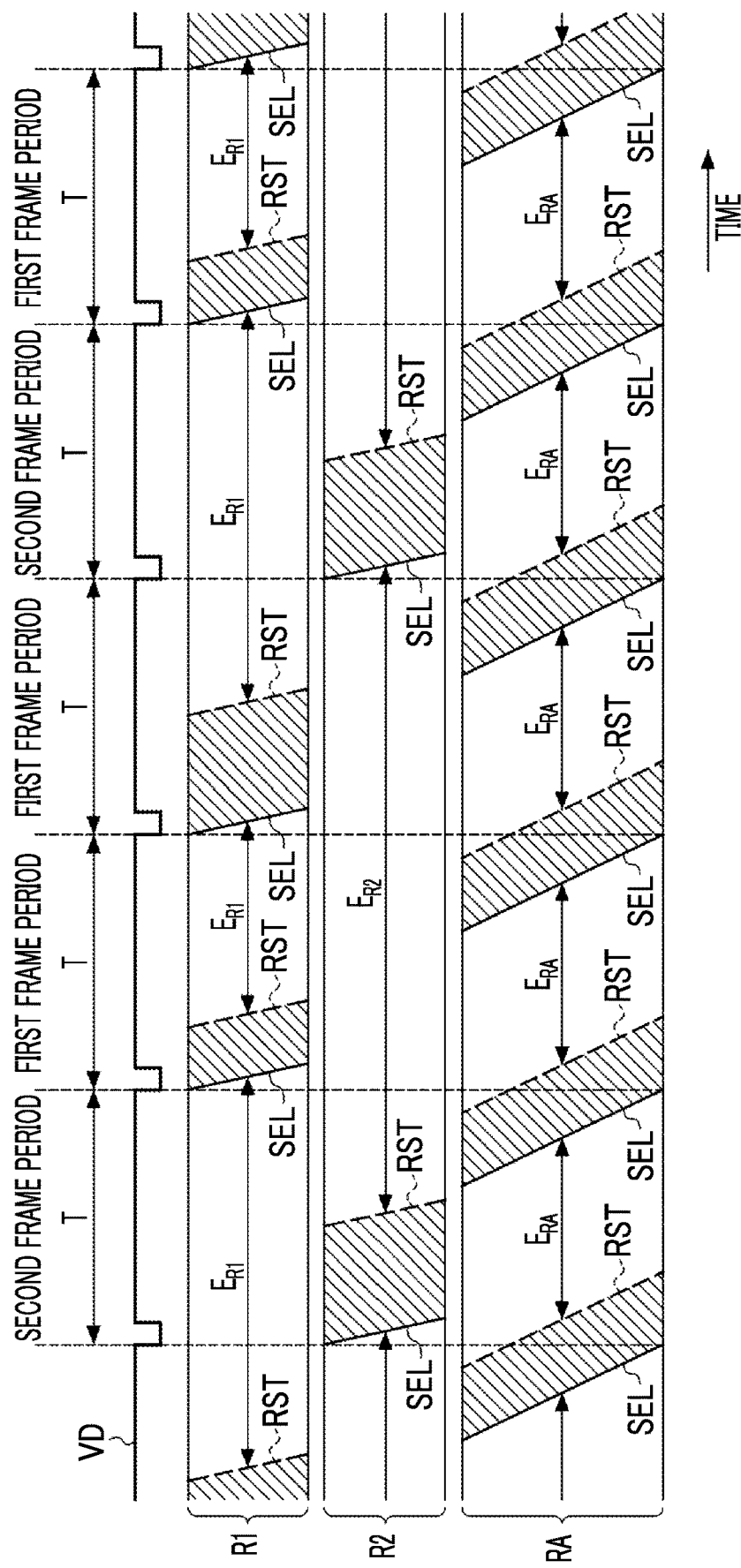
FIG. 13 is a diagram showing an example of imaging timing according to a modification example of the second embodiment.

FIG. 13 shows an example of imaging timing in the motion picture imaging mode according to the modification example of the second embodiment. In the present modification example, the first exposure time $E_{R1}$ of the first phase difference pixel region R1 in which the signal readout is performed during the first frame period subsequent to the second frame period is set to be equal to or greater than the frame cycle T (that is, $T \leq E_{R1}$). As described above, in the present modification example, there are three types of exposure time: the second exposure time $E_{R2}$ that is equal to or greater than twice the frame cycle T; the first exposure time $E_{R1}$ that is equal to or greater than the frame cycle T; and the first exposure time $E_{R1}$ that is less than the frame cycle T.

In addition, in the second embodiment, the second exposure time $E_{R2}$ is set to be equal to or greater than twice the frame cycle T and less than three times the frame cycle T, but the second exposure time $E_{R2}$ may be set to equal to or greater than twice the frame cycle T. In a case where the second exposure time $E_{R2}$ is equal to or greater than K times and less than K+1 times the frame cycle T, the first readout processing is executed K times during the exposure period of the second phase difference pixel region R2, and second readout processing may be executed once each time the first readout processing is executed K times. Here, K is an integer equal to or greater than 2.

Further, in a case where the focus adjustment control of the first embodiment (refer to FIG. 10) is set to the first mode and the focus adjustment control of the second embodiment (refer to FIG. 12) is set to the second mode, the first mode and the second mode may be switchable. For example, the main control unit 50 may be configured to perform switching between the first mode and the second mode in accordance with the brightness of the subject.

Figure 14:
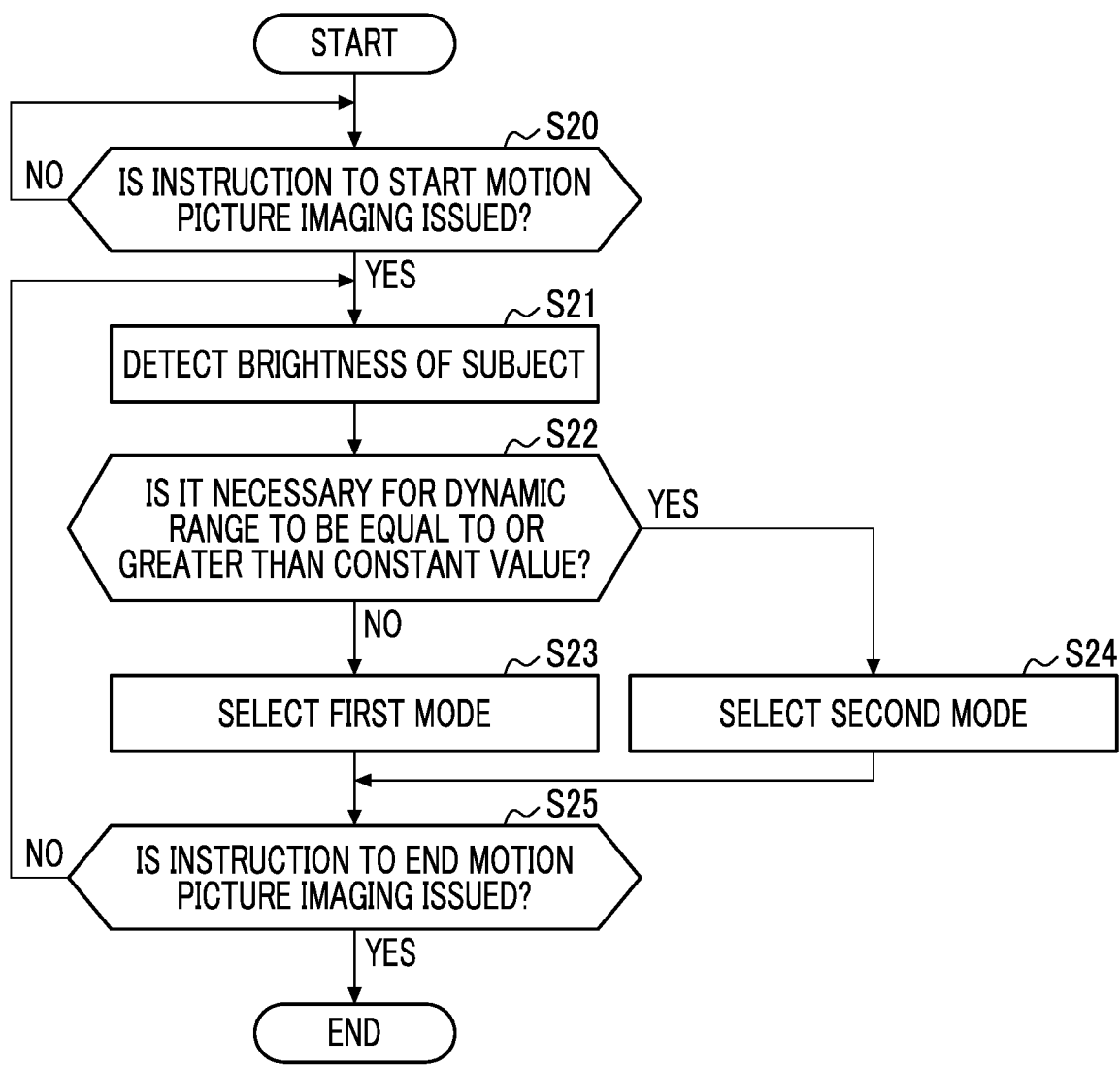
FIG. 14 is a flowchart showing an example of switching processing of switching between a first mode and a second mode.

FIG. 14 is a flowchart showing an example of switching processing of switching between the first mode and the second mode. First, the main control unit 50 determines whether or not an instruction to start the motion picture imaging is issued through the operation of the operating part 42 (step S20).

In a case where the main control unit 50 determines that the instruction to start the motion picture imaging is issued (step S20: YES), the main control unit 50 detects the brightness of the subject on the basis of the signals which are read out from the imaging pixel region RA (step S21). Next, the main control unit 50 determines whether or not it is necessary for the dynamic range to be equal to or greater than a constant value (step S22). In a case where the main control unit 50 determines that it is not necessary for the dynamic range to be equal to or greater than the constant value (step S22: NO), the main control unit 50 selects the first mode (step S23). In contrast, in a case where the main control unit 50 determines that it is necessary for the dynamic range to be equal to or greater than the constant value (step S22: YES), the main control unit 50 selects the second mode (step S24).

Next, the main control unit 50 determines whether or not an instruction to end the motion picture imaging is issued through the operation of the operating part 42 (step S25). In a case where the main control unit 50 determines that no instruction to end the motion picture imaging is issued (step S25: NO), the main control unit 50 advances the processing to step S21 and detects the brightness of the subject. In contrast, in a case where the main control unit 50 determines that the instruction to end the motion picture imaging is issued (step S25: YES), the main control unit 50 ends the processing.

As described above, in a case where the dynamic range is large, the second mode is selected. In the second mode, as described above, the phase difference pixels P1 and P2 are exposed at a plurality of exposure times. Therefore, it is possible to perform focus adjustment with high accuracy, on the basis of the signals which are read out from the phase difference pixels P1 and P2, even in a case where the dynamic range is large.

Third Embodiment

Next, a third embodiment will be described. In the third embodiment, the imaging sensor 20 is provided with three phase difference pixel regions including a first phase difference pixel region R1, a second phase difference pixel region R2, and a third phase difference pixel region R3.

Figure 15:
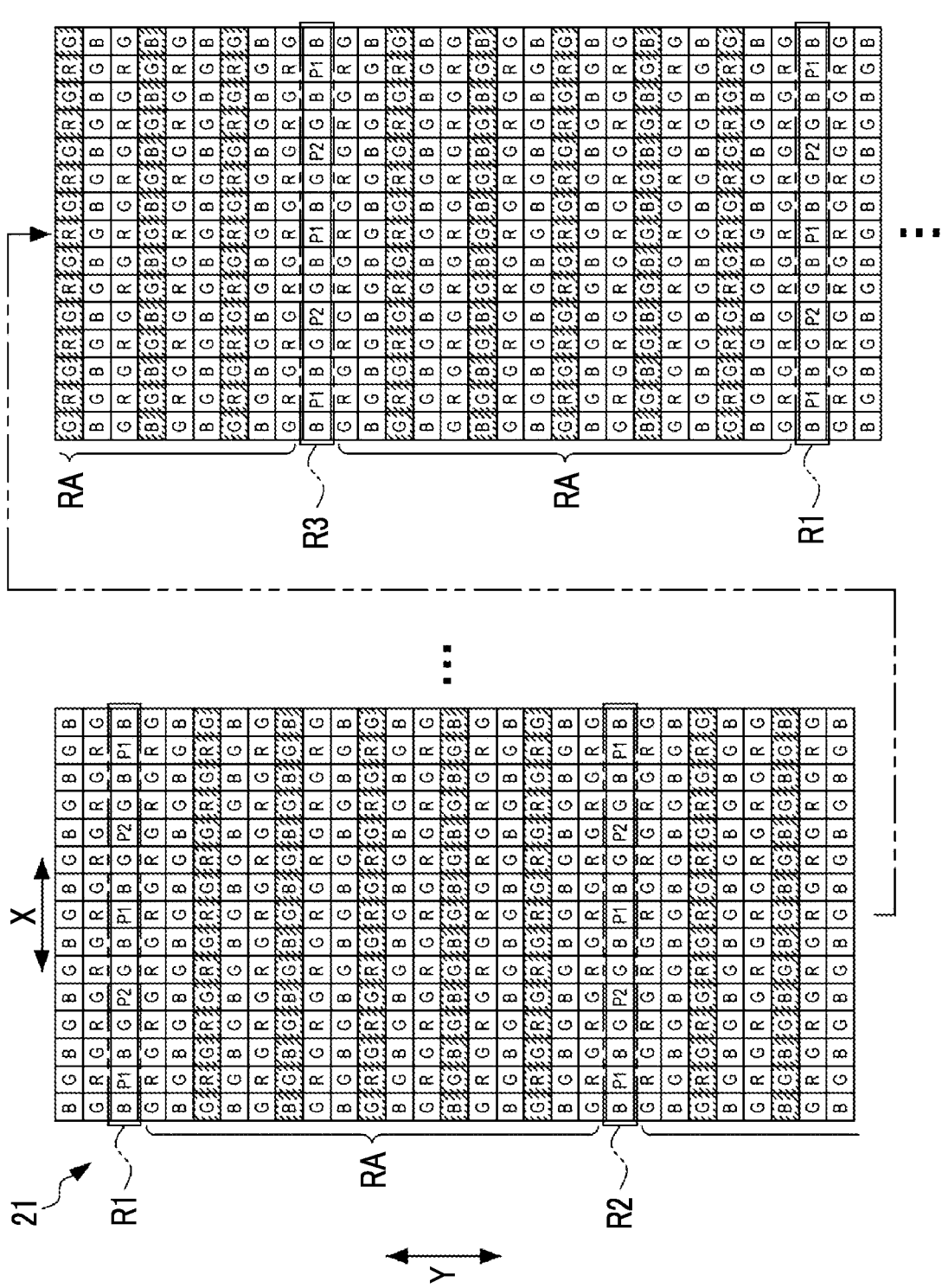
FIG. 15 is a diagram showing pixels from which signals are read out in the motion picture imaging mode in a third embodiment.

FIG. 15 is a diagram showing pixels from which signals are read out in the motion picture imaging mode in a third embodiment. In the third embodiment, the first phase difference pixel region R1, the second phase difference pixel region R2, and the third phase difference pixel region R3 are repeatedly arranged in the Y direction. In the Y direction, the imaging pixel regions RA are disposed respectively between the first phase difference pixel region R1 and the second phase difference pixel region R2, between the second phase difference pixel region R2 and the third phase difference pixel region R3, and between the third phase difference pixel region R3 and the first phase difference pixel region R1.

In the third embodiment, by independently resetting and reading out the signals for each of the three phase difference pixel regions, the exposure times of the phase difference pixels P1 and P2 can be set to be equal to or greater than twice the frame cycle T and less than three times the frame cycle T.

Figure 16:
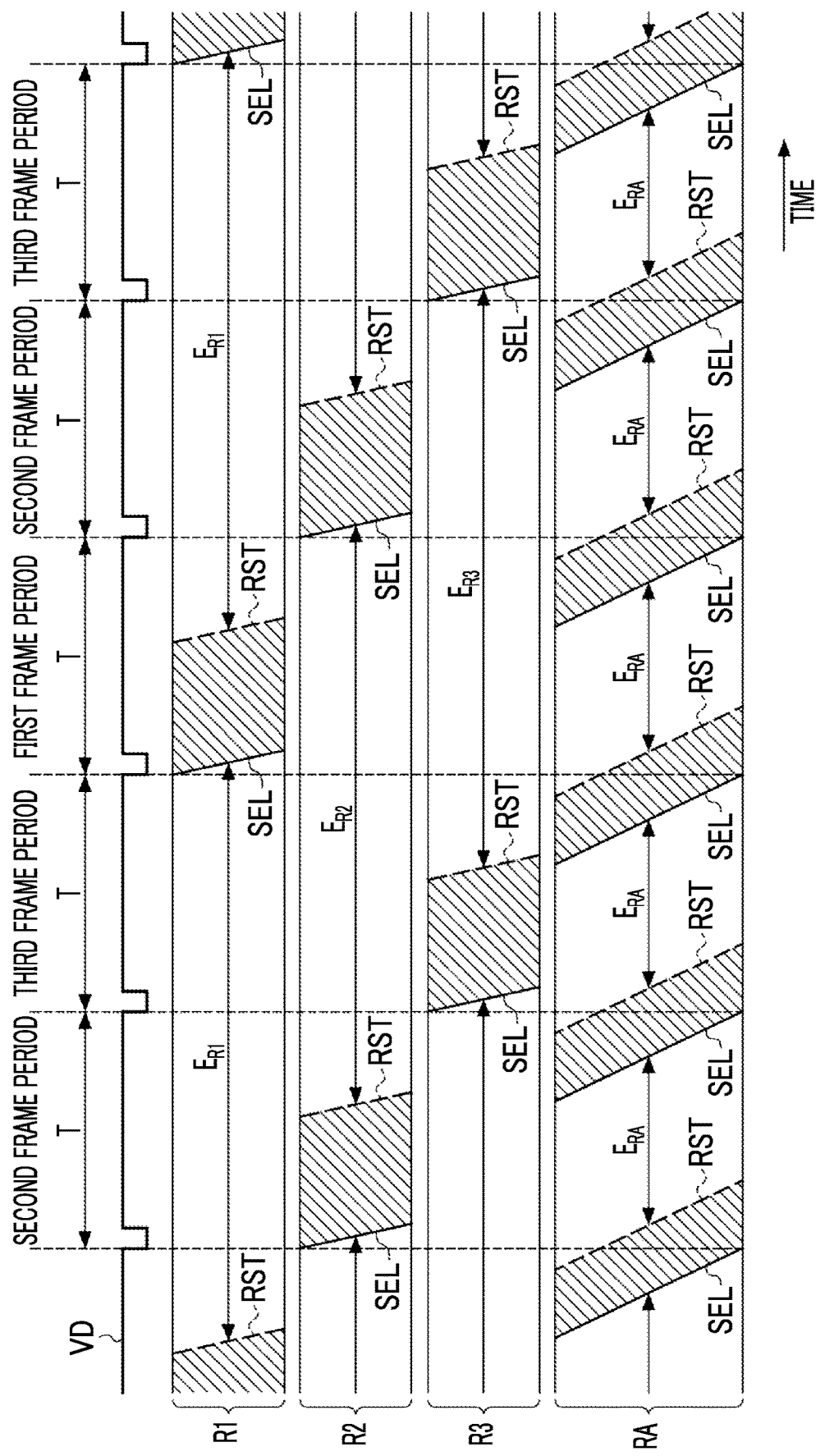
FIG. 16 is a diagram showing an example of imaging timing according to the third embodiment.

FIG. 16 shows an example of imaging timing according to the third embodiment. In the present embodiment, the main control unit 50 sequentially selects the first phase difference pixel region R1, the second phase difference pixel region R2, and the third phase difference pixel region R3 for each frame cycle T, and reads out the signal. In the present embodiment, the first exposure time $E_{R1}$, the second exposure time $E_{R2}$, and the third exposure time $E_{R3}$ are different from the imaging exposure time $E_{R4}$. The first exposure time $E_{R1}$, the second exposure time $E_{R2}$, and the third exposure time $E_{R3}$ may be different from one another.

In addition, it is also possible to provide the imaging sensor 20 with four phase difference pixel regions. In a case where the imaging sensor 20 is provided with N phase difference pixel regions ranging from the first phase difference pixel region R1 to the Nth phase difference pixel region RN arranged in the Y direction, the main control unit 50 sequentially selects each of the phase difference pixel regions for each frame cycle T, and reads out the signal thereof. In such a case, the main control unit 50 may set the exposure time of the phase difference pixel region to be less than N times the frame cycle. Here, N is an integer equal to or greater than 3.

Fourth Embodiment

Next, a fourth embodiment will be described. In the fourth embodiment, it is possible to execute a third mode in which a repetitive signal is read out from only the first phase difference pixel region R1 of the first phase difference pixel region R1 and the second phase difference pixel region R2.

Figure 17:
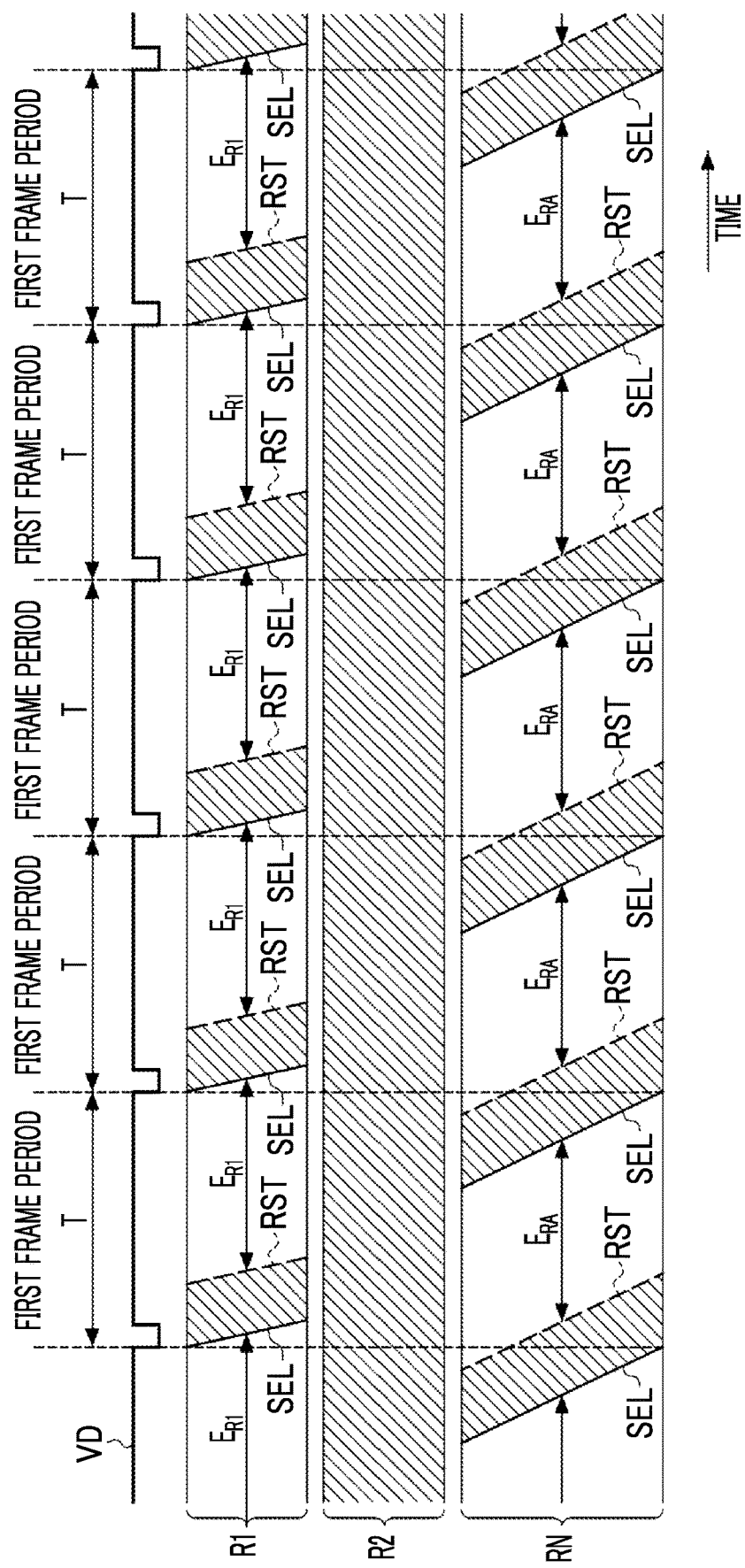
FIG. 17 is a diagram showing an example of imaging timing in a third mode.

FIG. 17 shows an example of imaging timing in the third mode. In the third mode, the main control unit 50 does not read out a signal from the second phase difference pixel region R2 of the first phase difference pixel region R1 and the second phase difference pixel region R2 (refer to FIG. 9), and reads out a signal for each frame cycle T only from the first phase difference pixel region R1. That is, the main control unit 50 is able to execute the third mode in which only the first readout processing is repeated without performing the second readout processing.

In the present embodiment, the above-mentioned first mode and third mode can be switched. For example, the main control unit 50 switches between the first mode and the third mode in accordance with the speed of movement of the subject. For example, the main control unit 50 detects the speed of movement of the subject by obtaining the movement vector of the subject between the frames, on the basis of the signals which are read out from the imaging pixel region RA for each frame cycle T.

In the first mode shown in the first embodiment, signals are read out from the phase difference pixels P1 and P2 that are different between the frames. Therefore, phase difference information having high resolution can be obtained. Therefore, the first mode is particularly appropriate for focus adjustment control in a situation in which the movement of the subject is small. In contrast, the third mode is appropriate for the focus adjustment control in a situation in which the movement of the subject is large since the positions of the phase difference pixels P1 and P2 which are read out between the frames do not change.

Figure 18:
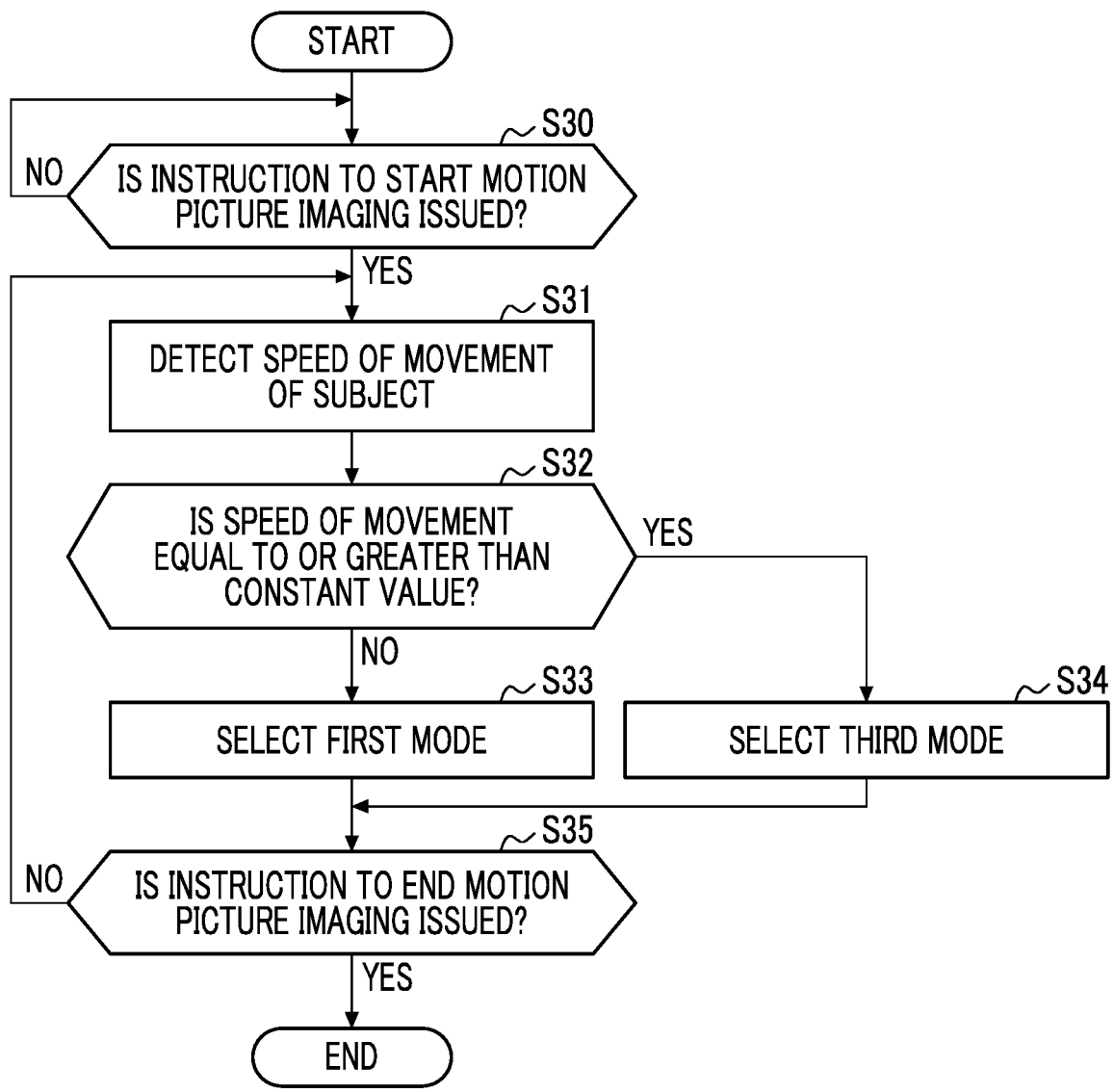
FIG. 18 is a flowchart showing an example of switching processing of switching between the first mode and the third mode.

FIG. 18 is a flowchart showing an example of switching processing of switching between the first mode and the third mode. First, the main control unit 50 determines whether or not an instruction to start the motion picture imaging is issued through the operation of the operating part 42 (step S30).

In a case where the main control unit 50 determines that the instruction to start the motion picture imaging is issued (step S30: YES), the main control unit 50 detects the speed of movement of the subject on the basis of the signals which are read out from the imaging pixel region RA (step S31). Next, the main control unit 50 determines whether or not the detected speed of movement is equal to or greater than a constant value (step S32). In a case where the main control unit 50 determines that the speed of movement is less than the constant value (step S32: NO), the main control unit 50 selects the first mode (step S33). In contrast, in a case where the main control unit 50 determines that the speed of movement is equal to or greater than the constant value (step S32: YES), the main control unit 50 selects the third mode (step S34).

Next, the main control unit 50 determines whether or not an instruction to end the motion picture imaging is issued through the operation of the operating part 42 (step S35). In a case where the main control unit 50 determines that no instruction to end the motion picture imaging is issued (step S35: NO), the main control unit 50 advances the processing to step S31 and detects the brightness of the subject. In contrast, in a case where the main control unit 50 determines that the instruction to end the motion picture imaging is issued (step S35: YES), the main control unit 50 ends the processing.

As described above, in a case where the speed of movement of the subject is high, the third mode is selected. In the third mode, since the positions of the phase difference pixels P1 and P2 which are read out from between the frames do not change, the focus adjustment can be performed with high accuracy.

[First Modification Example of Imaging Sensor]

Next, a first modification example of the imaging sensor 20 will be described. In the imaging sensor 20 according to the present modification example, the arrangement of the phase difference pixels P1 and P2 is different from that of the first embodiment. Hereinafter, the configuration of the imaging sensor 20 according to the present modification example will be described compared with the configuration of the imaging sensor 20 according to the first embodiment.

In the imaging sensor 20 according to the first embodiment, each of the first phase difference pixel region R1 and the second phase difference pixel region R2 includes the pair of phase difference pixels P1 and P2 (refer to FIGS. 8 and 9). Hereinafter, the phase difference pixels P1 and P2 included in the first phase difference pixel region R1 are referred to as "the pair of first phase difference pixels P1 and P2". Further, the phase difference pixels P1 and P2 included in the second phase difference pixel region R2 are referred to as "the pair of second phase difference pixels P1 and P2".

In the first embodiment, the pair of first phase difference pixels P1 and P2 are arranged in the same row, and are thus selected through the same row selection line L1 (refer to FIG. 5). Similarly, the pair of second phase difference pixels P1 and P2 are arranged in the same row, and are thus selected through the same row selection line L1.

Figure 19:
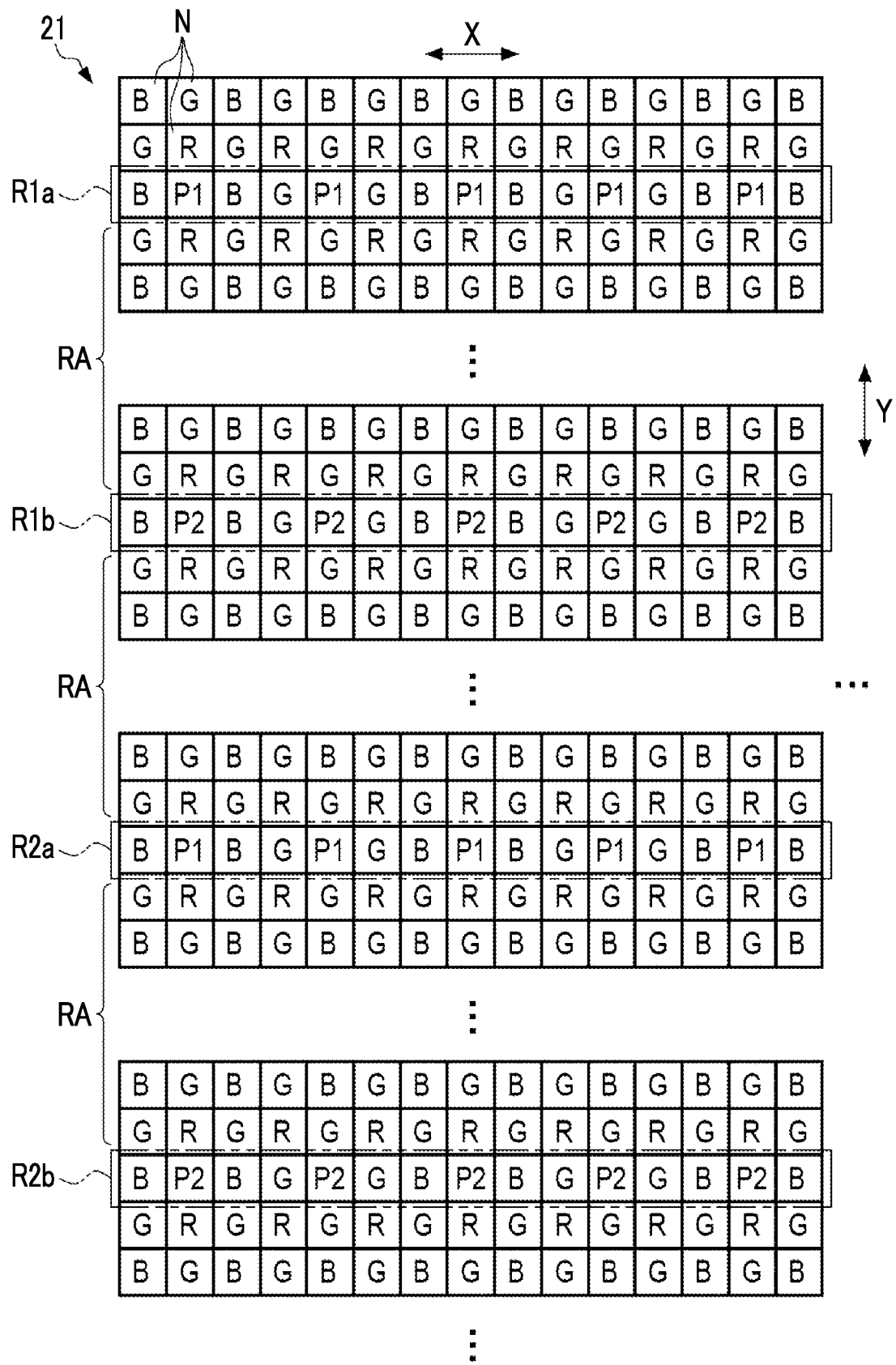
FIG. 19 is a diagram showing an example of pixel array of an imaging sensor according to a first modification example.

FIG. 19 shows an example of pixel array of the imaging sensor 20 according to the present modification example. In the present modification example, two types of first phase difference pixel regions including a first phase difference pixel region R1a and a first phase difference pixel region R1b are provided. Similarly, two types of second phase difference pixel regions including a second phase difference pixel region R2a and a second phase difference pixel region R2b are provided.

The first phase difference pixel region R1a includes only the first phase difference pixel P1 of the pair of first phase difference pixels P1 and P2. The first phase difference pixel region R1b includes only the first phase difference pixel P2 of the pair of first phase difference pixels P1 and P2. In the present modification example, the first phase difference pixel region R1a and the first phase difference pixel region R1b are arranged in the Y direction with the imaging pixel region RA interposed therebetween.

The second phase difference pixel region R2a includes only the second phase difference pixel P1 of the pair of second phase difference pixels P1 and P2. The second phase difference pixel region R2b includes only the second phase difference pixel P2 of the pair of second phase difference pixels P1 and P2. In the present modification example, the second phase difference pixel region R2a and the second phase difference pixel region R2b are arranged in the Y direction with the imaging pixel region RA interposed therebetween.

In the present modification example, the pair of first phase difference pixels P1 and P2 are arranged in different rows, and are thus selected by two row selection lines L1 arranged in the Y direction. Similarly, the pair of second phase difference pixels P1 and P2 are arranged in different rows, and are thus selected by two row selection lines L1 arranged in the Y direction.

The first phase difference pixel regions R1a and R1b and the second phase difference pixel regions R2a and R2b are repeatedly arranged in the Y direction with the imaging pixel region RA interposed therebetween.

FIG. 20 shows pixels from which the signals are read out in the motion picture imaging mode in the present modification example. In the motion picture imaging mode, the first phase difference pixel regions R1a and R1b are read out in the first frame period. The second phase difference pixel regions R2a and R2b are read out in the second frame period. Other imaging operations are similar to the imaging operation of the first embodiment.

The first phase difference pixel region R1a and the first phase difference pixel region R1b may be provided adjacent to each other in the Y direction. Further, the second phase difference pixel region R2a and the second phase difference pixel region R2b may be provided adjacent to each other in the Y direction.

[Second Modification Example of Imaging Sensor]

Next, a second modification example of the imaging sensor 20 will be described. The imaging sensor 20 according to the present modification example is a so-called dual-pixel CMOS image sensor in which each pixel 26 is composed of two photodiodes.

Figure 21:
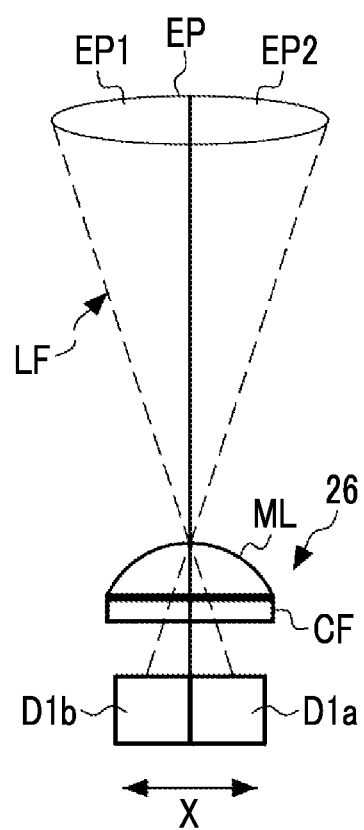
FIG. 21 is a diagram showing a pixel configuration of an imaging sensor according to a second modification example.

FIG. 21 shows a pixel configuration of the imaging sensor 20 according to the present modification example. In the present modification example, the phase difference pixel and the imaging pixel have the same configuration. The pixel 26 is configured to include a pair of photodiodes D1a and D1b, a color filter CF, and a microlens ML. The pair of photodiodes D1a and D1b are disposed adjacent to each other in the X direction below the color filter CF.

The photodiode D1a receives the luminous flux LF from the exit pupil EP1 among the exit pupils EP1 and EP2 divided in the X direction. The photodiode D1b receives the luminous flux LF from the exit pupil EP2 among the exit pupils EP1 and EP2 divided in the X direction.

The pixel 26 functions as an imaging pixel by reading out a signal from both of the pair of photodiodes D1a and D1b and adding the readout signal to the pixel 26. Further, the pixel 26 functions as a phase difference pixel by reading out the signal from one of the pair of photodiodes D1a and D1b.

The arrangement of the first phase difference pixel region R1, the second phase difference pixel region R2, and the imaging pixel region RA in the present modification example is similar to that of the first embodiment (refer to FIGS. 8 and 9).

In the present modification example, the main control unit 50 reads out a signal from one of the pair of photodiodes D1a and D1b for at least some of the pixels 26 included in the first phase difference pixel region R1. Similarly, the main control unit 50 reads out the signal from one of the pair of photodiodes D1a and D1b for at least a part of the pixels 26 included in the second phase difference pixel region R2. Further, the main control unit 50 reads out signals from both of the pair of photodiodes D1a and D1b for the pixel 26 included in the imaging pixel region RA.

In addition, all the pixels 26 of the first phase difference pixel region R1 and the second phase difference pixel region R2 may be made to function as the phase difference pixels.

In addition, in each of the above-mentioned embodiments and modification examples, the imaging sensor 20 is composed of the imaging region 21, the vertical scanning circuit 22, the line memory 23, the horizontal scanning circuit 24, and the output amplifier 25. However, the imaging sensor 20 may be composed of only the imaging region 21. The vertical scanning circuit 22, the line memory 23, the horizontal scanning circuit 24, and the output amplifier 25 may be provided inside the processor 40.

Further, each of the above-mentioned embodiments and modification examples can be combined with each other as long as no contradiction occurs.

In the above-mentioned embodiments, various processors shown below can be used as the hardware structure of the control unit using the processor 40 as an example. The various processors include, in addition to the CPU, which is a general-purpose processor that functions by executing software (program), a processor such as an FPGA of which the circuit configuration can be changed after manufacturing. The FPGA includes a dedicated electric circuit, which is a processor having a circuit configuration specially designed for executing a specific processing, such as PLD or ASIC.

The control unit may be configured as one of the various processors, or may be configured as a combination of two or more of the same or different kinds of processors (for example, a combination of a plurality of FPGAs or a combination of a CPU and an FPGA). Further, the plurality of control units may be constituted of one processor.

A plurality of examples in which a plurality of control units are configured as one processor can be considered. In the first example, as represented by computers such as a client and a server, there is a form in which one processor is constituted of a combination of one or more CPUs and software and this processor functions as a plurality of control units. As a second example, as typified by system on chip (SOC), there is a form in which a processor that implements the functions of the whole system which includes a plurality of control units with one IC chip is used.

As described above, the control unit can be configured by using one or more of the above-mentioned various processors as a hardware-like structure.

Further, as the hardware structure of these various processors, more specifically, it is possible to use an electric circuit in which circuit elements such as semiconductor elements are combined.

The contents described and illustrated above are detailed descriptions of the parts relating to the technique of the present disclosure, and are merely examples of the technique of the present disclosure. For example, the above description of the configuration, function, effect, and advantage is an example of the configuration, function, effect, and advantage of a portion relating to the technique of the present disclosure. Therefore, it is needless to say that unnecessary parts may be deleted, new elements may be added, or replacements may be made in the described contents and illustrated contents shown above without departing from the technical scope of the present disclosure. Further, in order to avoid complications and facilitate understanding of the parts relating to the technique of the present disclosure, in the description contents and the illustrated contents shown above, the description about common technical knowledge and the like which require special explanation in order to enable the implementation of the technique of the present disclosure is not given.

All documents, patent applications, and technical standards described in the present specification are incorporated into the present specification by reference to the same extent as in a case where the individual documents, patent applications, and technical standards were specifically and individually stated to be incorporated by reference.

What is claimed is:

1. An imaging apparatus comprising:
   a processor; and
   an imaging element that includes column signal lines which are for reading out signals and extend signals and extend in a first direction and a plurality of phase difference pixels which are arranged in a second direction intersecting the first direction,
   wherein the imaging element has a first phase difference pixel region and a second phase difference pixel region each including the plurality of phase difference pixels, and an imaging pixel region between the first phase difference pixel region and the second phase difference pixel region in the first direction,
   the processor is configured to
   cause the imaging element to perform imaging at a frame cycle,
   execute first readout processing of reading out a signal from the first phase difference pixel region during a first frame period, and
   execute second readout processing of reading out a signal from the second phase difference pixel region during a second frame period subsequent to the first frame period, and
   a first exposure time, during which the first phase difference pixel region is exposed, and a second exposure time, during which the second phase difference pixel region is exposed, are different from an exposure time of the imaging pixel region.

2. The imaging apparatus according to claim 1, wherein the first exposure time and the second exposure time are each equal to or greater than the frame cycle.

3. The imaging apparatus according to claim 1, wherein the first exposure time and the second exposure time are different from each other.

4. The imaging apparatus according to claim 1, wherein the processor is configured to:
   make a first mode executable, in which the first readout processing and the second readout processing are alternately executed such that the first exposure time and the second exposure time are each less than twice the frame cycle.

5. The imaging apparatus according to claim 4, wherein the processor is configured to:
   make a second mode executable, in which the second exposure time is set to be equal to or greater than K times the frame cycle and less than K+1 times the frame cycle, the first readout processing is executed K times during an exposure period of the second phase difference pixel region, and the second readout processing is executed once each time the first readout processing is executed K times, in a case where K is an integer equal to or greater than 2.

6. The imaging apparatus according to claim 5, wherein in the second mode, the first exposure time is less than the frame cycle.

7. The imaging apparatus according to claim 5, wherein the processor is configured to:
   perform switching between the first mode and the second mode in accordance with a brightness of a subject.

8. The imaging apparatus according to claim 4, wherein the processor is configured to:
   make a third mode executable, in which only the first readout processing is repeated without performing the second readout processing.

9. The imaging apparatus according to claim 8, wherein the processor is configured to:
   perform switching between the first mode and the third mode in accordance with a speed of movement of a subject.

10. The imaging apparatus according to claim 1, wherein:
    in a case where N is an integer equal to or greater than 3, the imaging element has N phase difference pixel regions ranging from the first phase difference pixel region to Nth phase difference pixel region arranged in the second direction, and
    the processor selects each of the phase difference pixel regions for each frame cycle and reads out a signal, and makes an exposure time of the phase difference pixel region less than N times the frame cycle.

11. The imaging apparatus according to claim 1, wherein:
    the imaging element includes a plurality of row selection lines extending in the second direction,
    the first phase difference pixel region includes a pair of first phase difference pixels as the plurality of phase difference pixels,
    the second phase difference pixel region includes a pair of second phase difference pixels as the plurality of phase difference pixels,
    the pair of first phase difference pixels are selected through the same row selection line,
    the pair of second phase difference pixels are selected through the same row selection line, and
    the first phase difference pixel region and the second phase difference pixel region are alternately disposed in the first direction with the imaging pixel region interposed therebetween.

12. The imaging apparatus according to claim 1, wherein:
    the imaging element includes a plurality of row selection lines extending in the second direction, the first phase difference pixel region includes a pair of first phase difference pixels as the plurality of phase difference pixels, the second phase difference pixel region includes a pair of second phase difference pixels as the plurality of phase difference pixels, the pair of first phase difference pixels are respectively selected through the plurality of row selection lines arranged in the first direction, the pair of second phase difference pixels are respectively selected through the plurality of row selection lines arranged in the first direction, and the first phase difference pixel region and the second phase difference pixel region are alternately disposed in the first direction with the imaging pixel region interposed therebetween.

13. The imaging apparatus according to claim 1, wherein:

the plurality of phase difference pixels included in the first phase difference pixel region and the second phase difference pixel region and imaging pixels in the imaging pixel region each have a pair of photoelectric conversion elements, the processor reads out a signal of one of the pair of photoelectric conversion elements in the plurality of phase difference pixels, and reads out the signal from both of the pair of photoelectric conversion elements from the imaging pixel, and the first phase difference pixel region and the second phase difference pixel region are alternately disposed in the first direction with the imaging pixel region interposed therebetween.

14. A driving method of an imaging apparatus that has an imaging element including column signal lines which are for reading out signals and extend signals and extend in a first direction and a plurality of phase difference pixels which are arranged in a second direction intersecting the first direction, in which the imaging element has a first phase difference pixel region and a second phase difference pixel region each including the plurality of phase difference pixels, and an imaging pixel region between the first phase difference pixel region and the second phase difference pixel region in the first direction, the driving method comprising:

causing the imaging element to perform imaging at a frame cycle;

executing first readout processing of reading out a signal from the first phase difference pixel region during a first frame period; and executing second readout processing of reading out a signal from the second phase difference pixel region during a second frame period subsequent to the first frame period, wherein a first exposure time, during which the first phase difference pixel region is exposed, and a second exposure time, during which the second phase difference pixel region is exposed, are different from an exposure time of the imaging pixel region.

15. A non-transitory computer readable medium storing a program for operating an imaging apparatus that has an imaging element including column signal lines which are for reading out signals and extend signals and extend in a first direction and a plurality of phase difference pixels which are arranged in a second direction intersecting the first direction, in which the imaging element has a first phase difference pixel region and a second phase difference pixel region each including the plurality of phase difference pixels, and an imaging pixel region between the first phase difference pixel region and the second phase difference pixel region in the first direction, the program causing the imaging apparatus to execute:

imaging at a frame cycle by using the imaging element;

first readout processing of reading out a signal from the first phase difference pixel region during a first frame period; and second readout processing of reading out a signal from the second phase difference pixel region during a second frame period subsequent to the first frame period, wherein a first exposure time, during which the first phase difference pixel region is exposed, and a second exposure time, during which the second phase difference pixel region is exposed, are different from an exposure time of the imaging pixel region.

* * * * *